United States Patent
Estes et al.

(10) Patent No.: US 7,158,776 B1
(45) Date of Patent: Jan. 2, 2007

(54) TECHNIQUES FOR VOICE-BASED USER AUTHENTICATION FOR MOBILE ACCESS TO NETWORK SERVICES

(75) Inventors: Robert S. Estes, Santa Clara, CA (US); Wen-Pai Lu, San Jose, CA (US); Michele Guel, San Jose, CA (US); Craig Huegen, Bartelso, IL (US); Albert Roethlisberger, San Jose, CA (US); Robert Scarbrough, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1242 days.

(21) Appl. No.: 09/956,204

(22) Filed: Sep. 18, 2001

(51) Int. Cl.
*H04Q 7/20* (2006.01)

(52) U.S. Cl. ............ 455/411; 455/410; 455/435.1; 380/247

(58) Field of Classification Search ............ 455/411, 455/410, 435.1; 380/247, 249, 275
See application file for complete search history.

(56) References Cited

U.S. PATENT DOCUMENTS

| | | | |
|---|---|---|---|
| 5,999,812 A | 12/1999 | Himsworth | ............ 455/435 |
| 6,084,967 A | 7/2000 | Kennedy et al. | ............ 380/247 |
| 6,201,871 B1 | 3/2001 | Bostley, III et al. | ........ 380/249 |
| 6,957,337 B1 * | 10/2005 | Chainer et al. | ............ 713/186 |

\* cited by examiner

*Primary Examiner*—Erika A. Gary
(74) *Attorney, Agent, or Firm*—Hickman Palermo Truong & Becker LLP

(57) ABSTRACT

Techniques for granting access on a network having a network service to a user of a mobile device having a microphone includes determining a first identification uniquely associated with a registered user having a registered voiceprint that matches a voiceprint of the user of the mobile device. A second identification uniquely associated with the mobile device is also determined. It is then determined whether to grant access based on the first identification and the second identification. If it is determined to grant access, access is granted on the network to the user. Various aspects of the invention allow a user to be authenticated separately of the mobile device by the voice of the user, and granted access to a network service based on both the user's identity and the identity of the mobile device. Both the user's voice and the device identity are provided using the current capabilities of wireless telephones. Obtaining the first identification and second identification within a specified time interval makes confidently practical the technique of verifying that a certain user controls a certain mobile device, and then allowing access by that device to protected services.

67 Claims, 13 Drawing Sheets

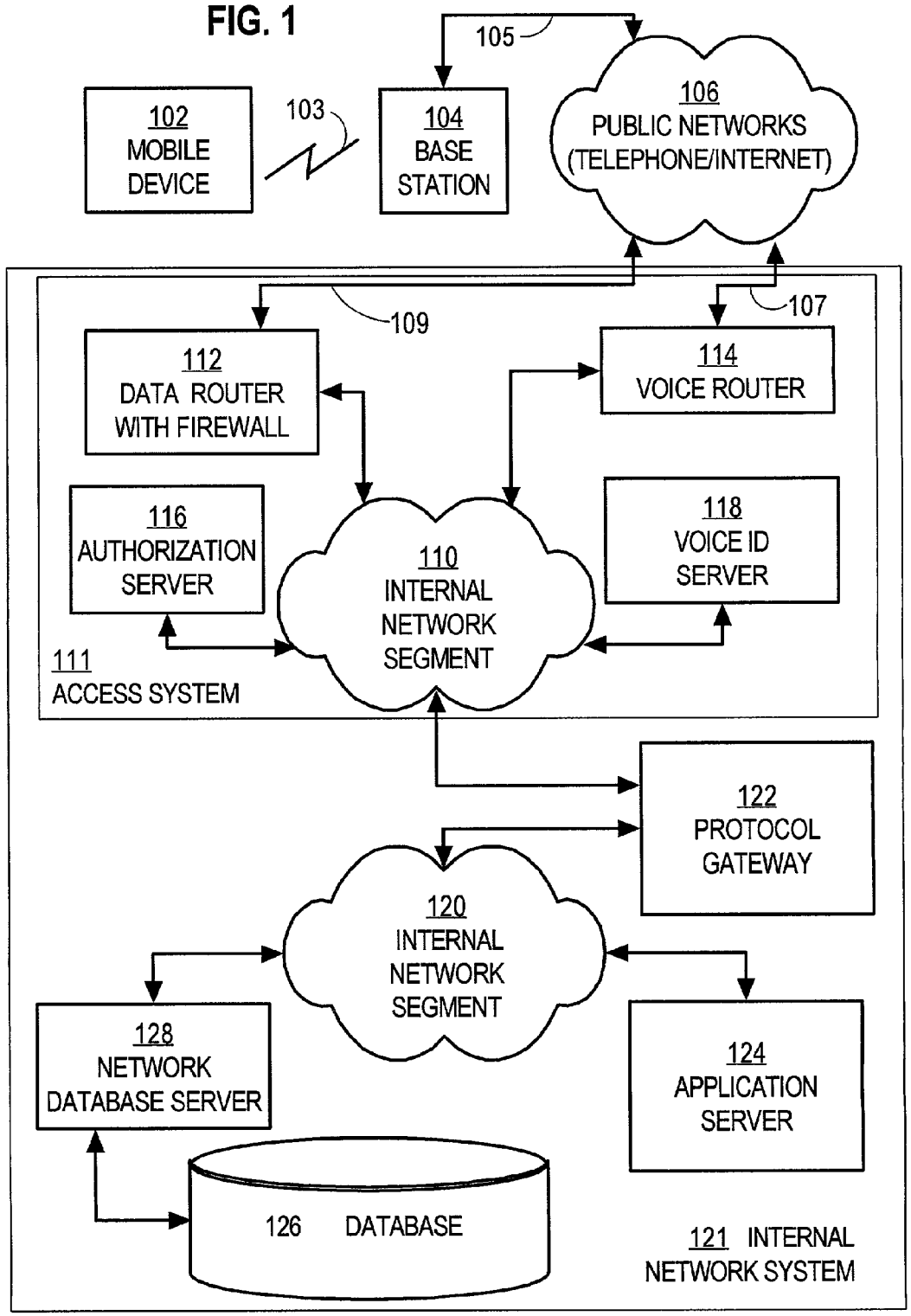

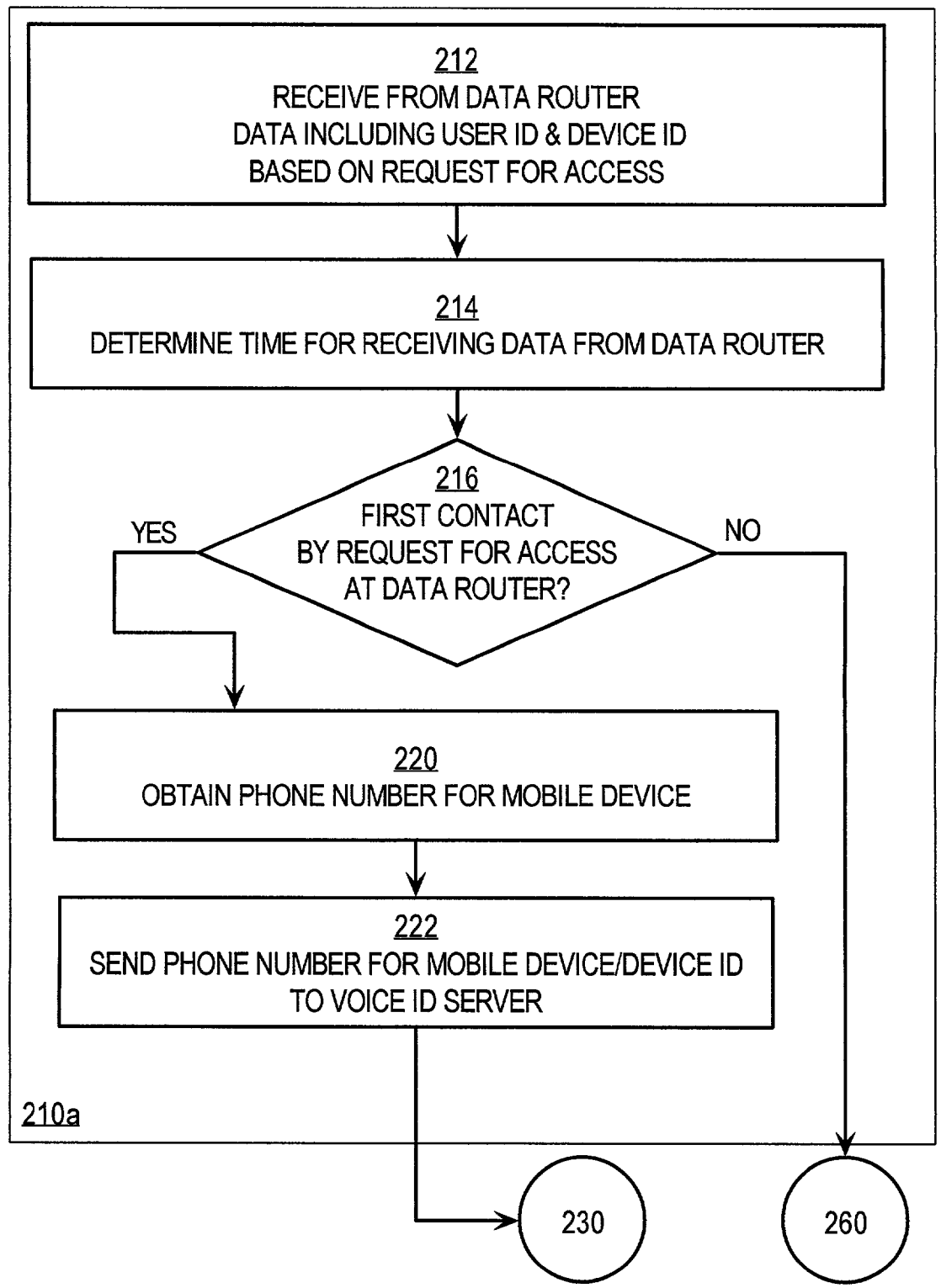

TECHNIQUES FOR VOICE-BASED USER AUTHENTICATION FOR MOBILE ACCESS TO NETWORK SERVICES

FIELD OF INVENTION

The present invention generally relates to accessing services on a network from a mobile device. The invention relates more specifically to providing access to the services based on voice recognition of a user of the mobile device.

BACKGROUND OF THE INVENTION

A corporation or other entity often provides services to its officers, employees, partners and customers that are not available to the general public. Many of these services are accessed through a network internal to the entity. The network is made up of several computing devices serving as terminals communicating through zero or more computing devices serving as network devices responsible for passing information among the terminals. For example, financial reports are available by running a network financial application on one computing device that employs data stored in a network database on another computing device. Often, a separate database server process, with which the financial application interacts, provides the network database services.

To achieve access to the services available on the network, users log onto the network at terminals connected to the network and identify themselves. For example, an individual user provides a user identification and password. If the user identification and password match information stored on the network, the user is granted access to the network. A network authentication, authorization and accounting server (AAA Server) executing on a different computing device often performs the dialog with the user or the comparison of identification information with stored information or both.

The user may have different privileges for different applications providing different services on the network. For example, an employee in the human resources department might have authorized access to a human resources database on the network through a human resources application, but no authorized access to the financial application at all. Such access authorization is typically based on authentication of the user's identification.

Restricting access to users who know valid values for a user identification and associated password provides security for the services and data on the network. Restricting physical access to the terminals on the internal network, such as keeping terminals in facilities that require a badge or key to enter, also provides security.

To provide secure access to services on the internal network to users who have moved outside the secure facilities presents special problems. The problems arise because of the use of public networks and the portability of the mobile devices serving as terminals.

The mobile device often communicates with the internal network over public circuit-switched networks, such as employed by the telephone companies, or over the public packet-switched networks, such as the Internet.

In addition, wireless telephones and hand held devices have become popular mobile devices to serve as terminals for obtaining network services. Especially attractive are wireless telephones with data transport capabilities, such as wireless telephones employing the Wireless Application Protocol (WAP). When these devices are remotely connected to an enterprise network, users can conveniently access many network services and extensive content. However, the easy portability of such devices increases the chances that the device can fall outside the control of the authorized user through loss or theft.

The combination of public network paths and non-secure mobile devices makes secure access for services on the internal network a problem. Passwords and user identification strings passed over the Internet can be discovered easily unless they are encrypted. Standard encryption technologies build authentication software and data into the terminal. Such encryption is not secure if the terminal falls into the hands of an unauthorized person. Because the physical security of the mobile device serving as a terminal cannot be presumed, it is essential to authenticate the user, not just the mobile device.

A common approach to user authentication that is separate from device authentication involves the use of one-time passwords. Only the authorized user can generate the password. It is little use to detect the password as it passes over public networks because the password cannot be used again in another session. The authorized user obtains the one-time password from a second appliance, separate from the mobile device serving as the terminal to the internal network. The user enters a private key or code into the second appliance; in response, the second appliance generates a unique one-time password based on the private key, and displays it. For example, a token appliance given to the authorized user produces a one-time password on demand. An example of such a one-time password generator is the SafeWord password generator from Secure Computing Corporation, Roseville, Minn.

While suitable for many purposes, this approach suffers from several disadvantages. For example, in practice, entering the one-time password is very cumbersome on voice-based mobile devices, such as wireless telephones, commonly carried by authorized users beyond secure facilities. Even many wireless data telephones do not have a full keypad, and share several characters or functions on each key. In addition, the one-time password often is valid only during a short time interval, and consists of a meaningless string of alphanumeric characters. The user is required to enter the private key into the code generator using its keypad, view the resulting one-time password, and quickly enter the one-time password into the mobile device before expiration of the short time interval, when the one-time password disappears from the display of the code generator. This places extra pressure on a user of this system, and increases the likelihood of error in entering random characters having no meaning to the user, and thus increases the likelihood of failing to obtain access.

Other proposed approaches to identifying the user separately from the device focus on measuring an aspect of the human user, called a biometric, such as a fingerprint or retinal image. Such approaches call for building a biometric sensor into the mobile device and integrating logic associated with the sensor into the logic associated with the communications aspect of the wireless device.

Such approaches suffer from several disadvantages. For example, there are few standards for biometric sensors, so the logic to integrate biometric sensor output with the communication protocols depends on the sensor installed, and is thus cumbersome and expensive to produce. In addition, the sensor data processing is likely to be computationally intensive, exceeding the resources typically available on the most portable devices such as wireless telephones. Furthermore, hundreds of thousands of wireless telephones will be deployed in the next few years without such biometric sensors, and none of these deployed telephones would be able to employ such approaches.

Based on the foregoing, there is a clear need for a user authentication process separate from device authentication that makes use of existing capabilities of mobile devices such as wireless telephones.

In particular, there is a need for an authentication process that makes use of the voice capture and transmission properties of wireless telephones.

SUMMARY OF THE INVENTION

The foregoing needs, and other needs and objects that will become apparent from the following description, are achieved in the present invention, which comprises, in one aspect, a method for granting access on a network having a network service to a user of a mobile device including a microphone. The method includes determining a first identification uniquely associated with a registered user having a registered voiceprint that matches a voiceprint of the user of the mobile device. A second identification uniquely associated with the mobile device is also determined. It is then determined whether to grant access based on the first identification and the second identification. If it is determined to grant access, access is granted on the network to the user.

According to another aspect of the invention, a method of obtaining access on a network having a network service by a user of a mobile device having a microphone includes establishing a connection between the mobile device and the network which forwards the user's voice to a first process associated with the network service. The user speaks into the mobile device to provide a voiceprint of the user in the first process. Data indicating a unique identification for the mobile device is sent from the mobile device to a second process associated with the network service. Access on the network is obtained only if a registered user associated with the voiceprint by the first process is also associated with the unique identification for the mobile device in a data structure stored on the network.

According to another aspect of the invention, a method of granting access on a network having a network service to a user of a mobile device having a microphone includes receiving first data generated at the microphone of the mobile device. A first voiceprint is derived from the first data. It is determined whether to send second data indicating the user is a registered user to a first process on the network based at least in part on the first voiceprint. If it is determined to send the second data, the second data is sent to the first process for determining whether to authorize the user for access on the network.

In other aspects, the invention encompasses an apparatus, a system, and a computer readable medium, including a carrier wave, configured to carry out the foregoing steps.

Various aspects of the invention allow a user to be authenticated separately of the mobile device by the voice of the user, and granted access to a network service based on both the user's identity and the identity of the mobile device.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 is a block diagram that illustrates an overview of a system for granting access to network services to a user of a mobile device according to one embodiment;

FIG. 2B is a flowchart that illustrates an embodiment of a step of the method depicted in FIG. 2A;

DETAILED DESCRIPTION OF THE PREFERRED EMBODIMENT

Figure 2A:
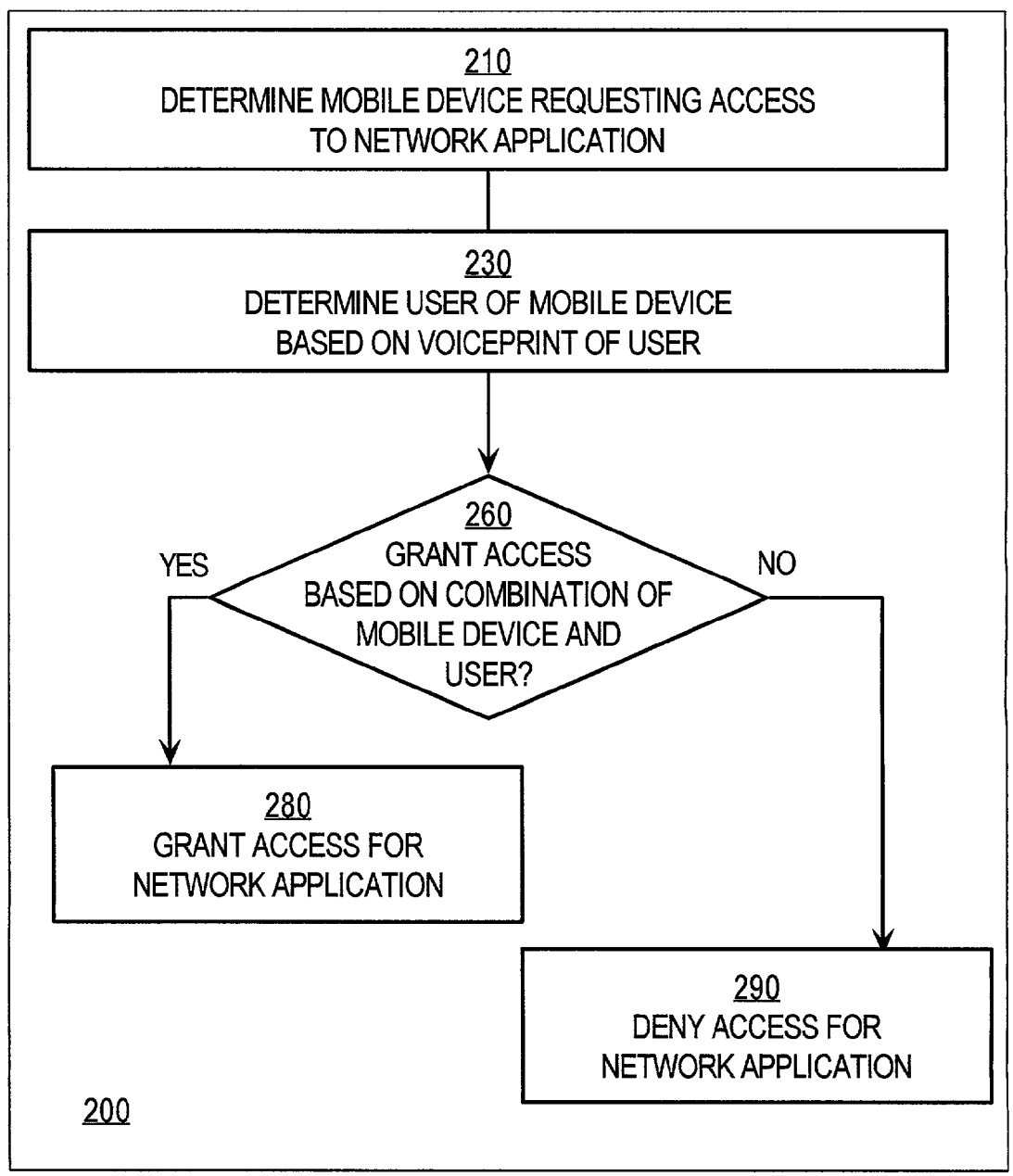
FIG. 2A is a flowchart that illustrates a high level overview of one embodiment of a method for granting access to network services to a user of a mobile device by a AAA server.

Techniques for granting access to network services are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. Embodiments are described according to the following outline: Operational Context; Structural Overview; Functional Overview; Authentication Server; Mobile Device Process; Voice Identification Server; Hardware Overview.

—Operational Context

In one embodiment, voice-based authentication for mobile access to network services is achieved through a wireless, data-capable telephone using the Wireless Applications Protocol (WAP) for communicating between a client process on the mobile device and a server process on a network device. Embodiments may also be used with mobile devices using other protocols besides WAP. Certain embodiments use circuit-switched communication channels for voice and data. However, other embodiments may be used with other mobile devices using packet-switched, or mixed packet-switched and circuit-switched communication channels.

To illustrate an example of use, network services are described herein in terms of a financial application employing a database server on a corporate internal network (intranet). However, embodiments are applicable to any services available over a network to which access is controlled. Such network services include, but are not limited to, applications running on a computing device in a corporate intranet, customer account applications running on a banking customer network, functions available from an Internet service provider (ISP), applications available from an application service provider (ASP), and functions of appliances connected to a network, such as printing options for printers, navigation and security functions of an automobile, environmental controls of a home, controls on a refrigerator, etc.

—Structural Overview

FIG. 1 is a block diagram that illustrates an overview of a system for granting access to network services to a user of a mobile device according to one embodiment. In the following description a network server is a process executing on one or more computing devices on the network. A server provides a service in response to requests for service from another process, called a client, on the network. As illustrated, each server executes on a separate computing device; but, in practice, one or more servers may execute on the same computing device on the network.

FIG. 1 shows a wireless mobile device 102 such as a cellular telephone. The mobile device 102 includes a microphone. The mobile device also includes a processor running a client process that requests services from servers on networks that grant access to the client process. In cellular telephones, the mobile device also includes special voice transmission equipment and speakers.

The mobile device 102 communicates with a base station 104 using an electromagnetic communication channel 103 that is typically based on public cellular radio interface standards. The communication channel 103 may be analog (e.g., Advanced Mobile Phone Systems (AMPS) or digital (e.g., Global System for Mobile communication (GSM). The base station 104 is part of the Public Land Mobile Network (PLMN).

The information received at the base station 104 from the mobile device 102 is transmitted through communication channel 105 to a destination designated by the mobile device over the public networks 106, which include the telephone system and a public, packet-switched data network such as the Internet. The telephone system uses circuit-switched voice and data flow, which devotes a connection between a base station and a destination to a single user. The Internet uses packet-switched data flow, which shares circuits between nodes of the network to carry multiple packets of information from a variety of users. Information destined for the mobile device arrives at the base station 104 from the public networks over communication channel 105 and is transmitted to the mobile device 102 using communication channel 103. The communication channel 103 can be circuit-switched, such as with the Global System for Mobile communication (GSM) telephones for which the Wireless Application Protocol (WAP) is designed; and the channel 103 can be packet-switched, such as employed by both CDPD and GPRS telephones, for which WAP is also applicable.

One destination for information from the mobile device 102 may be an internal packet-switched network 121 that uses the Internet Protocol (IP) for data communication. For example, mobile device 102 may be deployed to obtain the financial services provided by network server 124 based on data in database 126 managed by database server 128.

To obtain services from the internal network system 121, the mobile device client process sends and receives information packets over the communication channels. In one embodiment, the mobile device makes a circuit-switched connection to router 112 using a modem connected to router 112, and sends the packets over the modem connection. In another embodiment, the mobile device makes a connection to the Internet at some other point and transfers packets from that point to router 112 over the Internet.

For example, the mobile device makes a packet-switched CDPD or GPRS connection to the base station 104, which is connected to the Internet. For another example, the mobile device makes a GSM circuit-switched connection to the base station 104, which forwards the call to a modem at a Service Provider, which forwards packets arriving over the modem connection onto the data router 112. To accomplish this, the mobile device sends digital packets over the air to the base station. The mobile device designates such packets as a data call. The base station, in any digital cellular system (not AMPS), sends the data on to a modem pool in the PLMN. The mobile device specifies the destination of this modem call. Then the modem pool in the PLMN sets up a circuit-switched call to the destination modem attached to Data Router 112. To facilitate this, Base Station 104 may be communicatively coupled to a switching system in the Public Networks 106.

Communication channel 109 represents the channel over which data packets arrive at router 112, whether as a circuit-switched modem connection or as a packet switched Internet connection. An example of a commercial product suitable for use as router 112 is the 3600 Series modular, high-density access routers from Cisco Systems, Inc., San Jose, Calif.

A firewall process running on router 112 provides security by denying access to client processes unless authorized by an AAA server 116. The firewall process communicates with the AAA server using an established protocol. For example, the firewall process communicates with the AAA server 116 using the RADIUS authentication protocol. Using the RADIUS protocol, the firewall process on router 112 sends a user identification (user ID) and password received from a client process, such as a client process on the mobile device, to the AAA server. The AAA server looks up the received user ID and password in a secure authentication database and determines whether the associated user is permitted to access the network. If the AAA server 116 returns a message indicating access is granted, the client process is allowed to communicate with servers on the internal network system 121. The servers may enforce additional access policies based on the user ID associated with the packets from the mobile device.

A protocol gateway 122 converts between communication protocols used by the servers on internal network segment 120 and the protocol used by the mobile device 102. For example, a WAP gateway converts between WAP used in packets communicated with WAP wireless devices to the Hypertext Transfer Protocol (HTTP) used by clients and servers that participate in the World Wide Web (WWW).

Unlike conventional access control techniques that grant access based on a user ID and password received at router 112, this embodiment also utilizes voice data received from the mobile device. In the illustrated embodiment, voice data is received over communication channel 107 at voice router 114. The voice router is configured to employ voice over IP ("VoIP") for forming data packets with the voice information and to send the packets with voice information to a special voice identification server (Voice ID server) 118 over internal network segment 110. As described in more detail below, the Voice ID server 118 determines that a user is who is claimed, based on a voiceprint derived from the voice information, rather than on a password. In this context, "voiceprint" refers broadly to any set of voice attributes that can be collected, stored and compared to ascertain the identity of the user, and not merely a recorded utterance that is compared with a substantially identical live utterance, e.g. one's spoken name. User identifying information then is passed to an AAA server 116, which determines whether to send to the firewall process a message granting access based at least in part on the information passed from the voice ID server 118.

According to the illustrated embodiment, voice information arrives over channel 107 instead of channel 109. Voice data is usually passed to voice router 114 using circuit-switched voice flow even when the mobile device is capable of packet-switched data flow. In addition, the equipment that processes voice data is often different as well. While router 112 need not be voice compatible, the router 114 should be voice compatible. In some embodiments, the voice ID server 118 is connected directly to the voice router 114. In another embodiment, the voice ID server 118 is connected directly to the public networks (116). In the illustrated embodiment, the voice ID server is connected through the internal network segment 110. To pass voice data over an IP network, the voice data should be repackaged for packet-switched data flow. Therefore, in this embodiment, the voice router 114 repackages the voice data using VoIP. The voice ID server is also capable of generating outbound voice information, and can direct the voice router 114 to place a voice call to any telephone, including the mobile device 102. An example voice router is the AS5300 series from Cisco Systems, Inc.

In other embodiments, the mobile device 102 or the base station or the voice router repackages the voice data into packets that can be packet switched, such as by using VoIP. In this embodiment, the voice packets are routed to the voice ID server 118, either from the router 112 or by voice router 114.

The data router 112 with firewall process, the voice router 114, the voice ID server 118, the AAA server 116, and the internal network segment 110 connecting them constitute the user access system 111 of this embodiment.

The protocol gateway 122, the application server 124, the internal network segment 120, the network database server 128 and the database 126 constitute the internal network system 121 in this embodiment.

—Functional Overview

FIG. 2A is a flowchart that illustrates a high level overview of one embodiment 200 of a method for granting access to network services to a user of a mobile device by the AAA server 116 at the focus of the access system 111.

In step 210 a unique identification is determined for the mobile device with the client process requesting access for the network service. In one embodiment, a combination of a manufacturer and serial number of the mobile device is used as the unique identification. In another embodiment, an encryption-based device certificate is used. In another embodiment, this unique identification is a permanent IP address assigned to the device; but the IP address is not used if the mobile device uses temporary IP addresses, such as those assigned by Dynamic Host Control Protocol (DHCP). In another embodiment, a telephone number assigned to the device by the PLMN system is used as the unique identification for the device. This number is typically broadcast by the mobile device when the device is powered on, and is automatically available to the router through calling number identification technology (such as ANI, or "Caller-ID"). Thus the identification for the mobile device is not cumbersome for a user to enter.

In step 230, the user of the mobile device is determined based on the voiceprint of the user. The user is specified by any unique identification maintained in data structures of the network. For example, the employee identification (employee ID) of a user of a corporate intranet is used as the unique identification for the user. The user specified by the unique identification is determined based on speech recognition or similar means. Therefore, typically, the user can provide identification simply by speaking into the microphone of the mobile device.

Speaking into a microphone is much less cumbersome than generating a DES token on a separate device and entering the token manually on a mobile telephone keypad. Speaking into the microphone also makes use of existing capabilities of mobile devices because all wireless telephones include microphones. Step 230 does not suffer the deficiencies of methods that require the addition of new biometric sensors onto the mobile devices.

Although illustrated in FIG. 2A with step 230 following step 210, the steps may be performed in any order or overlapping in time.

In step 260, it is determined to grant access based on both the user identification and the mobile device identification. The authentication is thus bimodal, involving both the device and the user. The bimodal authentication is robust against many types of weaknesses, such as lost or stolen mobile devices.

If it is determined to grant access in step 260, then control passes to step 280 to grant access for the intranet with the network service to the client process on the mobile device. As stated above, the network server providing the service may impose additional access restrictions based on the user ID. In the illustrated embodiment, a message granting access for the intranet is passed to the firewall process executing on the data router 112. In response, the firewall process opens a communication session between the client process on the mobile device and the servers on the intranet in any manner known in the art at the time the system is implemented.

If it is determined to deny access in step 260, then control passes to step 290 to deny access for the intranet with the network service to the client process on the mobile device. In the illustrated embodiment, either no message granting access for the intranet is passed to the firewall process executing on the data router 112, or an affirmative message denying access is passed to the firewall process. In response to receiving the message denying access, or after a fixed time without receiving any messages from the AAA server, the firewall process declines to open a communication session between the client process on the mobile device and the servers on the intranet.

The method of FIG. 2A makes robust, bimodal authentication more practical than other approaches. The method of FIG. 2A improves usability by dramatically reducing the manual keystrokes required for user authentication—replacing keystrokes with spoken words. In addition, by focusing changes in the AAA server, the method opens the way for extensions to the functionality of conventional AAA servers. Furthermore, no changes are required in the methods of the firewall process or data router 112, although another embodiment would implement certain of the subject processes in the firewall.

—Authentication Server

FIG. 2B is a flowchart that illustrates an embodiment 210a of step 210 for determining the unique identification for the mobile device by the AAA server 116 in the method depicted in FIG. 2A. Although the steps are illustrated in FIG. 2B in a particular order, the steps may be reordered or occur at overlapping times in other embodiments.

In step 212 a request for authentication is received by the AAA server 116 from the data router 112. The request is based on a request sent by the client process on the mobile device and includes data indicating a unique identification for the mobile device. For example, the request includes data indicating the telephone number of the mobile device, or the manufacturer and serial number of the mobile device.

In step 214 the time Td is determined when the unique identification for the mobile device is determined. In some embodiments, Td is the time the request is received by the data router 112; in other embodiments Td is the time the request from the data router 112 is received by the AAA server 116. In yet other embodiments other times are used as Td. The time Td is stored by the AAA server in a data structure in memory or on disk. The time Td is determined in order to enhance security by obtaining a voice-based identification using voice data from the mobile device within a short time of receiving the request for data from the mobile device. The determination of the time between voice identification and data request is described in more detail below with respect to step 260 in FIG. 2D.

Step 216 represents a decision point at which it is determined whether the first contact from the mobile device was made at data router 112 or at voice router 114. The different paths followed after step 216 can be implemented in any manner known in the art. For example, a different stored procedure can be used for first contact at a data router than is used for first contact at the voice router 114. As one alternative, the same procedure can be used with a branch point based on parameters stored in a data structure.

For example, a data structure storing values for the unique identifications for the mobile device and the user can include null values before such determinations are made. The branch is made based on which unique identification is non-null. Thus if the unique identification for the mobile device is non-null but the unique identification for the user is null, then it is indicated that the first contact is by the data router 112. If the unique identification for the user is also non-null at step 216, then it is indicated that the first contact is through voice router 114.

If it is determined in step 216 that the first contact is not through the data router 112, but already occurred at the voice router 114, then control passes to step 260 described below with reference to FIG. 2D.

If it is determined in step 216 that the first contact from the mobile device is through the data router 112, then the AAA server 116 takes steps to obtain a voiceprint of the user to ensure that the user of the mobile device is an authorized user. In the illustrated embodiment, the AAA server 116 passes control to step 220 to obtain the phone number for the mobile device and to step 222 to send the phone number to the voice ID server to initiate a telephone call to the mobile server to obtain the voiceprint of the user. Step 216 may be omitted in embodiments in which the telephone number of the mobile device is used as the unique identification for the mobile device. Control then passes to step 230 to determine a unique identification of the user based on a voiceprint.

In one embodiment using different procedures for requests initiated at the data router 112, the AAA server 116 is configured to retrieve a user profile from a database on the network based on the user ID in the request from the data router 112. A trigger attached to the database invokes a handling routine that sends a request to the voice ID server to make a telephone call to the mobile device and identify the user based on the user's voiceprint. The request includes the telephone number for the mobile device. Thus steps 220 and 222 are implemented as triggers and trigger handling routines for the database used by the authentication server. This approach minimizes the impact of the new steps on the existing AAA servers.

Figure 2C:
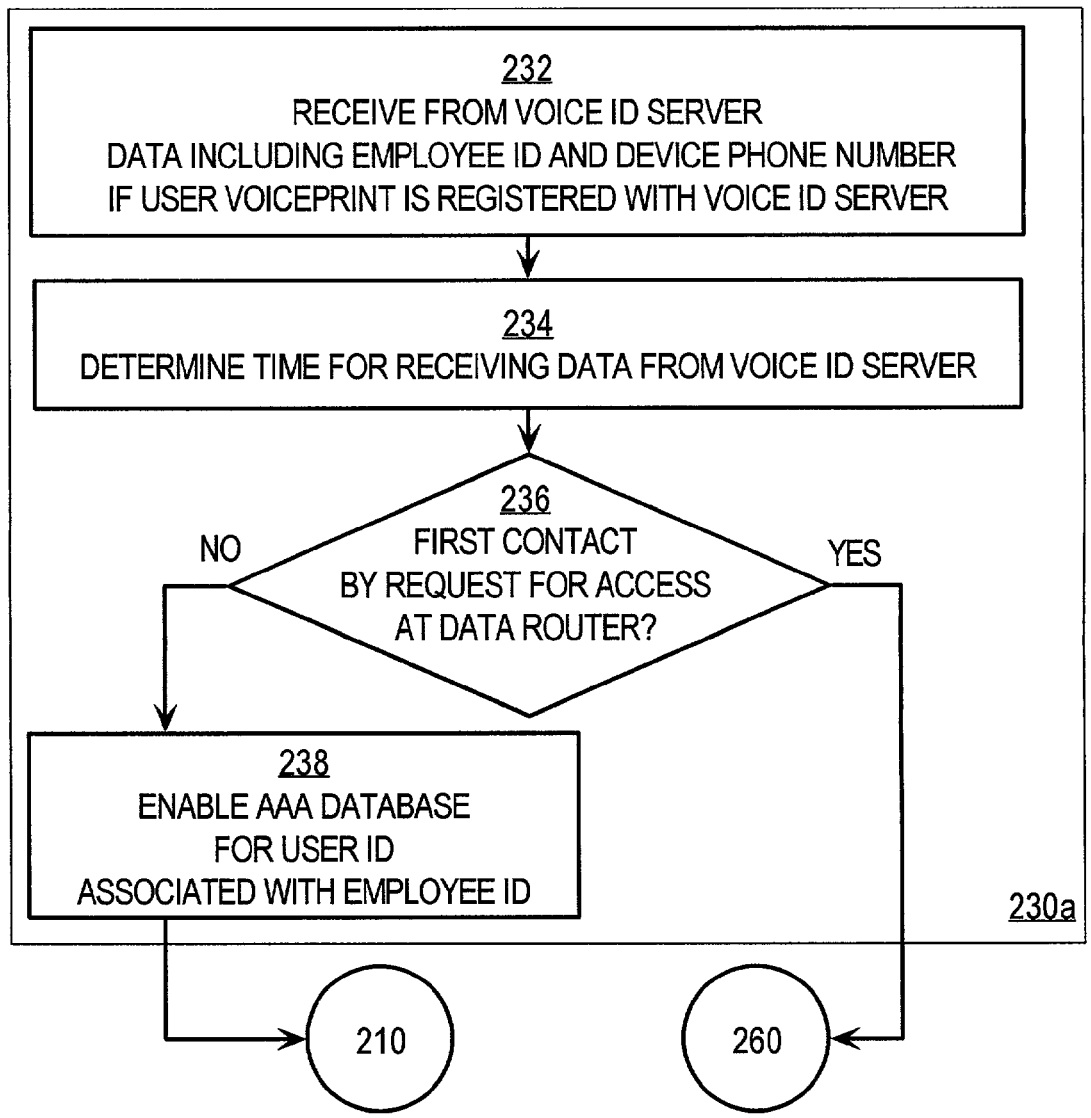
FIG. 2C is a flowchart that illustrates an embodiment of a step of the method depicted in FIG. 2A.

FIG. 2C is a flowchart that illustrates an embodiment 230a of a step 230 for determining the unique identification for the user of the mobile device by the AAA server 116 in the method depicted in FIG. 2A. Although the steps are illustrated in FIG. 2C in a particular order, the steps may be reordered or occur at overlapping times in other embodiments.

In step 232, the AAA server 116 receives from voice ID server 118 data including the unique identification of a registered user, if the user of the mobile device is a registered user as indicated at least by the user's voiceprint. In some embodiments, the data also includes the unique identification for the mobile device the authorized user is using. For example, the AAA server 116 receives the employee ID and device phone number if the user's voiceprint is registered with the voice ID server 118.

In the illustrated embodiment, this step is implemented by sending the unique identification for the registered user to a database server that manages the database used by the conventional AAA server. In such an embodiment, the AAA server 116 includes the database server and database. In embodiments in which the voice ID server was requested to make a telephone call to the mobile device, the data indicating the unique identification of the user is sent to the trigger handling routine that sent the request.

In step 234 the time Tu is determined when the unique identification for the user of the mobile device is determined. In different embodiments, Tu is the time the voice ID server 118 received the voice data, or computed the voiceprint, or matched the voiceprint to a registered voiceprint, and Tu is included in the message from the voice ID server. In other embodiments Tu is the time the data indicating the unique identification of the user is received from the voice ID server 118 by the AAA server 116. In yet other embodiments other times are used as Tu. The time Tu is stored by the AAA Server in a data structure in memory or on disk. The time Tu is determined in order to enhance security by obtaining a voice-based identification using voice data from the mobile device within a short time of receiving the request for data from the mobile device. The determination of the time between voice identification and data request is described in more detail below with respect to step 260 in FIG. 2D.

Step 236 represents a decision point at which it is determined whether the first contact from the mobile device was made at data router 112 or at voice router 114. The different paths followed after step 236 can be implemented in any manner known in the art, as described above with respect to step 216. If it is determined in step 236 that the first contact is not through the voice router 114, but already occurred at the data router 112, then control passes to step 260 described below with reference to FIG. 2D. If it is determined in step 236 that the first contact is through the voice router 114, then control passes to step 238 to enable the user's account in the AAA database before passing control to step 210 to determine the unique ID of the mobile device making a data request.

In step 238, an account in the AAA database is enabled for authentication of the user having a user ID associated with the employee ID. The account is enabled for a limited period of time. In the illustrated embodiment, many changes for the AAA server are made to the database used by the AAA server using database features supported by the database server. Such changes minimize the impact on existing AAA servers. In the illustrated embodiment, no authentication account is enabled in the AAA database unless and until data is received from the voice ID server that a registered user is using the mobile device. In step 238, a procedure in the AAA database is invoked to find the user ID associated in a special database table with the employee ID received in step 232. The procedure then enables the account for the associated user ID for the limited time. Prior to enabling the user ID account, requests for authentication from the firewall process indicating the user ID are denied by the AAA server 116. After enabling the user ID account, requests may be granted, depending on step 260, described below. In the illustrated embodiment, Tu is the time the AAA database is enabled for authentication of the user ID associated with the employee ID.

Control then passes to step 210 to determine the unique ID of the mobile device making a data request.

Figure 2D:
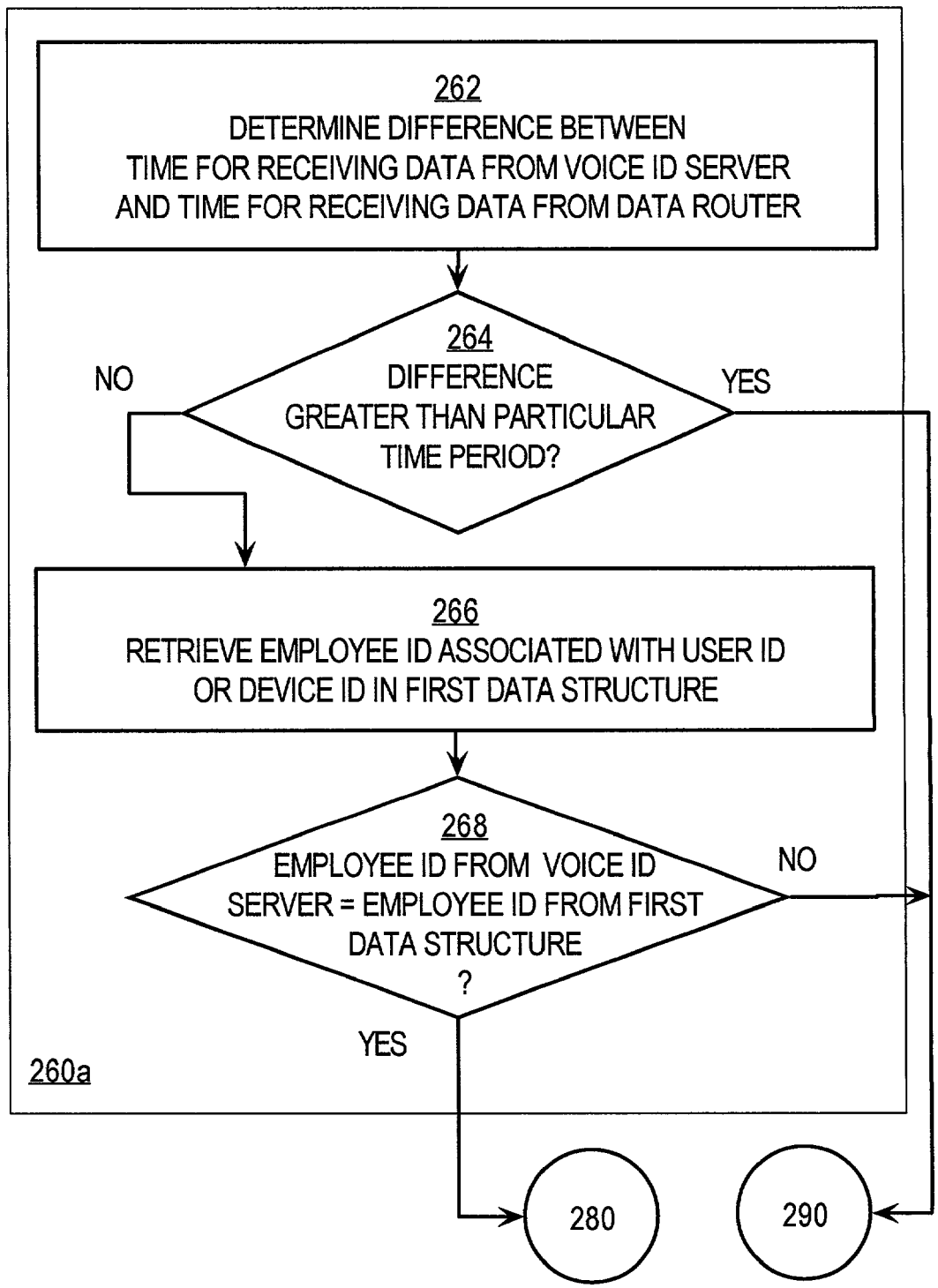
FIG. 2D is a flowchart that illustrates an embodiment of a step of the method depicted in FIG. 2A.

FIG. 2D is a flowchart that illustrates an embodiment 260a of step 260 for determining whether to grant access by the AAA server 116 in the method depicted in FIG. 2A. Although the steps are illustrated in FIG. 2D in a particular order, the steps may be reordered or occur at overlapping times in other embodiments.

In step 262, the AAA server 116 determines the difference in time between Td and Tu. In step 264, it is determined whether the time difference is greater than a particular time period. Limiting the time separation between Tu and Td, as performed in step 264 enhances security by obtaining a voice-based identification using voice data from the mobile device within a short time of receiving the request for data from the mobile device. Limiting the time difference limits the opportunities for the mobile device to be separated from the user by loss or theft. In some embodiments, the sign of the difference may be used with a particular time period that is not centered on zero. This allows different time separations for cases in which the voice contact precedes the data contact than in cases in which the data contact precedes the voice contact.

Steps 262 and 264 are performed automatically by the database server supporting the AAA server 116 in the embodiment that enables the user ID account associated with the employee ID in the AAA database for a limited time. In this embodiment, the limited time set in step 238 is equal to the particular time period.

If the time difference exceeds the particular time period, control passes to step 290 to deny access to the intranet and the intranet's network services.

If the time difference does not exceed the particular time period, control passes to steps 266 and 268 to impose a particular policy involving both the mobile device and the registered user. In other embodiments, other policies are imposed. In the illustrated embodiment, access is granted only if the user ID associated with the employee ID returned from the voice ID server 118 is the same as a user ID associated with the mobile device in a database used by the AAA server 116.

In step 266, an employee ID is retrieved from a database based on the unique identification for the mobile device. For example, the employee ID is retrieved based on the telephone number of the device. In some embodiments, a list of employee IDs may be associated with the same telephone number of the mobile device.

In some embodiments, a user profile for a user ID is stored in the AAA database with the employee ID. In such embodiments, a user ID included in the request from the data server is used to retrieve an employee ID. The user ID is associated with the unique identification for the mobile device because the user ID is included in the request for data from the mobile device. Thus the retrieved employee ID is associated with the unique identification for the mobile device.

In some embodiments, the AAA database associates a user ID with mobile devices and associates an employee ID with a user ID. In this case the user ID is retrieved based on the mobile device identification, such as the phone number, and the employee ID is retrieved based on the user ID. In this embodiment also, the retrieved employee ID is associated with the unique identification for the mobile device.

In step 268, it is determined whether the employee ID returned by the voice ID server is the same as the employee ID retrieved from the AAA database. If not, access is not granted and control passes to step 290. If the employee IDs are the same, then access is granted and control passes to step 280. Step 268 ensures that the registered user identified by the voice ID server is either an authorized user of the mobile device requesting services from the intranet, or is the person authorized to use the user ID in the request from the mobile device for services from the intranet.

One embodiment of step 260a is implemented using triggers and trigger handlers on the database used by the AAA server 116. However, any method known in the art may be used to implement the steps in other embodiments. In the embodiment using database triggers with the first contact through the voice router 114, after the account for the user ID based on the employee ID is enabled for the limited time, a request for access causes the AAA server to query the AAA database for the record belonging to the user ID. This query triggers a procedure that checks a separate database for the mobile device or mobile devices associated with the user ID or employee ID. If the procedure determines the database shows the unique identification for the mobile device is associated with the user ID, then a favorable response is returned to the AAA server 116, causing the AAA server to pass control to step 280. If not, an unfavorable response is returned, causing the AAA server to pass control to step 290.

——Mobile Device Process

Figure 3A:
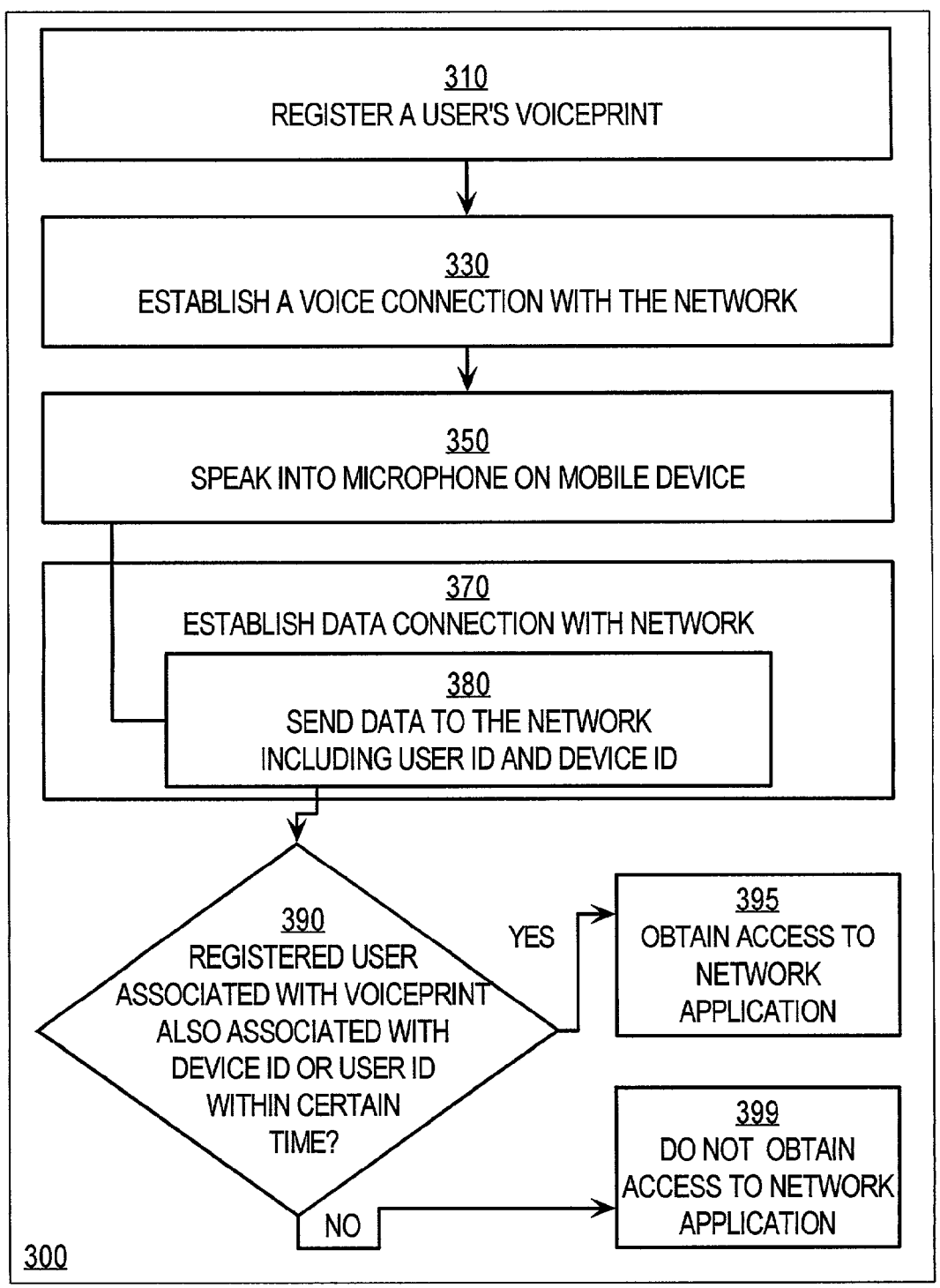
FIG. 3A is a flowchart that illustrates a high level overview of one embodiment of a method for obtaining access to network services by a user of a mobile device.

FIG. 3A is a flowchart that illustrates a high level overview of one embodiment of a method 300 for obtaining access to network services by a user of a mobile device 102. Although the steps are illustrated in FIG. 3A in a particular order, the steps may be reordered or occur at overlapping times in other embodiments.

In step 310, a user registers the user's own voice while using the mobile device. This step is described in greater detail below with reference to FIG. 3B.

In step 330, a voice connection is established with the intranet. In one embodiment the voice data is VoIP and the connection is made through data router 112. In another embodiment, the voice connection is established by placing a circuit-switched telephone call to the voice router or directly to the voice ID server 118. For example, the user may place the call using manual entry or by speed dialing the telephone number for the voice router and the connection may be accomplished with digital or analog communication over channel 103. In another embodiment, the voice connection is established in response to an incoming call from the voice router 114. In some embodiments, the incoming call is initiated by the voice ID server 118. In some embodiments, the incoming call establishes a voice connection after a data connection is established in step 380. In the illustrated embodiment, the voice router 114 is configured to forward voice data to the voice ID server 118.

In step 350 the user speaks near the microphone of the mobile device. In one embodiment, the words spoken by the user include words prompted by the voice ID server, such as words presented as text on a display of the mobile device, or words announced aurally through a speaker of the mobile device. For example, in one specific embodiment, the voice ID server generates and delivers to a speaker of the mobile device, a prompt that says, "Please speak your employee ID number." In response, the user recites the user's employee ID. The voice ID server then prompts the user to say a randomly selected phrase, e.g., "Please say the words 'Aug. 24, 1998.'" In response, the user repeats the random phrase presented by the voice ID server. The voice ID server determines whether the user is a registered user based at least in part on a voiceprint derived from the spoken words at the microphone. Use of a random phrase increases security by reducing the likelihood that an unauthorized user who obtains the mobile device can use a recording device to generate voice information matching the voice of the genuine user.

In step 370 a data connection is established with the intranet. This step is optional if the voice connection using packet-switched voice data is already established in step 330. Any technique can be employed to make this connection. For example the user presses a key indicating an icon representing the service provided by the intranet.

In step 380 a request for services from the intranet is sent to the router 112. The request includes data indicating a unique identification for the mobile device and a user ID. If step 370 is performed, step 380 is included as part of establishing the data connection. If step 370 is not performed, step 380 is performed as part of step 330. In some embodiments, the data connection is established before the voice connection is established in step 330.

In step 390 the AAA server determines whether to grant access based on the voiceprint and the unique identification for the mobile device and information stored by the AAA server. For example, access is granted only if the user's voiceprint is associated with a registered user, and if the registered user is associated with the mobile device in the AAA database. In another embodiment, access is not granted unless the user is associated with a registered user within a particular time period around a time when the unique identification for the mobile device is received at the AAA server 116.

If the AAA server determines to grant access, control passes to step 395 to obtain access to the services on the intranet over the mobile device. Otherwise control passes to step 399 to deny access.

In one embodiment, steps 330–390 are carried out in a specified or pre-determined relatively short period of time, or during the same call. Obtaining a first identification and second identification within a specified time interval makes confidently practical the technique of verifying that a certain user controls a certain mobile device, and then allowing access by that device to protected services.

Figure 3B:
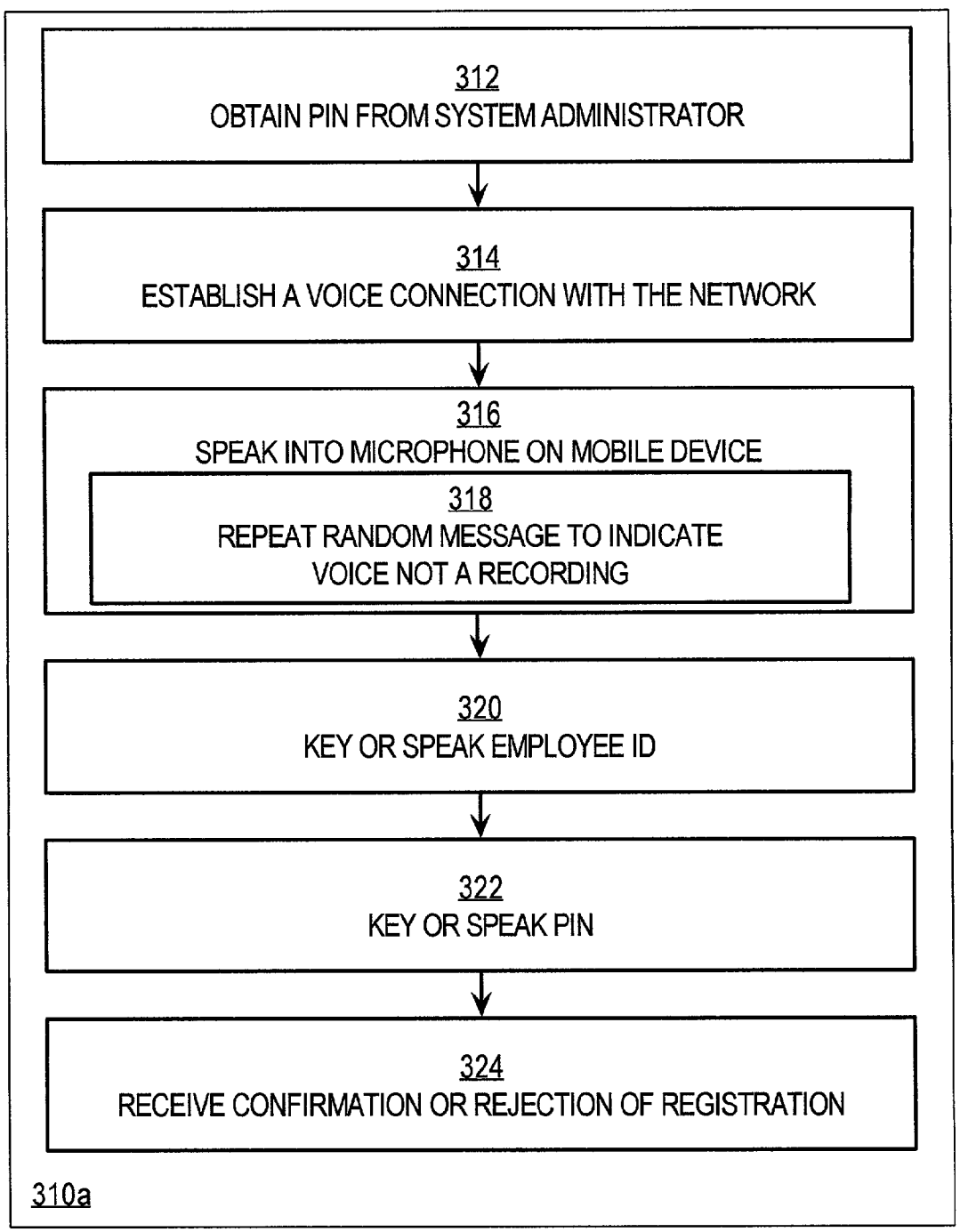
FIG. 3B is a flowchart that illustrates an embodiment of a step of the method depicted in FIG. 3A.

FIG. 3B is a flowchart that illustrates an embodiment 310a of step 310 for registering a user of a mobile device in the method depicted in FIG. 3A. Although the steps are illustrated in FIG. 3B in a particular order, the steps may be reordered or occur at overlapping times in other embodiments.

In step 312, a user obtains a personal identification number (PIN) that is valid for a certain time from a system administrator. For example, the user receives an e-mail with a telephone number of the voice router to call to register with the voice ID server, and a PIN valid for 24 hours from noon on the date the e-mail is sent.

In step 314, the user establishes a connection between the mobile device and the voice router 114 that forwards the voice data to the voice ID server 118. For example, the user employs a wireless telephone to call the number provided on the e-mail and connects with the voice router 114. In some embodiments, for additional security, the system administrator may require that the user register while using a particular mobile device.

In step 316, the user speaks into the microphone of the mobile device to generate data used by the voice ID server to derive a registered voiceprint. For example, the user speaks the user's name and employee ID at the microphone of the wireless telephone. In some embodiments, step 316 includes optional step 318 in which the user speaks a random phrase provided by the voice ID server to test that the words spoken are live and not being played back from a recording made at some time before placing the call.

In step 320 the unique identifier for the user, such as the employee ID, is entered by voice or keypad. This step is optional if the unique identifier is already entered in step 316. The voiceprint derived from the data generated at the microphone is stored in association with the unique identifier for the user.

In step 322 the PIN is entered by voice or keypad. This step is optional if the PIN is already entered in step 316. Based on the PIN and the time the connection is established, a voiceprint is derived and stored in association with the unique user identification by the voice ID server. For example, if the connection is established during the certain time when the PIN is valid, the voice ID server derives and stores a registered voiceprint in association with the employee ID. If the connection is not established in time or if the PIN is otherwise invalid, the voiceprint will not be derived or stored.

In one embodiment, steps 316–322 are required to be carried out in a specified or pre-determined relatively short period of time, or during the same call. Obtaining a first identification and second identification within a specified time interval makes confidently practical the technique of verifying that a certain user controls a certain mobile device, and then allowing access by that device to protected services.

In step 324, a message confirming or rejecting the registration of the user's voiceprint is received on the mobile device. The confirmation or rejection is presented as text on a screen of the mobile device or aurally through speakers on the mobile device.

According to this embodiment, the voiceprint is not derived from the data generated at the microphone in a process running on the mobile device. Such a process is expected to consume considerable computational resources that exceed what is usually available on a mobile device. Rather, the voiceprint is derived on the voice ID server, which may be a powerful voice processor. Thus, the mobile device is only performing functions for which it is readily or already designed, to generate voice data at the microphone and transmit the voice data over the public networks.

——Voice Identification Server

Figure 4A:
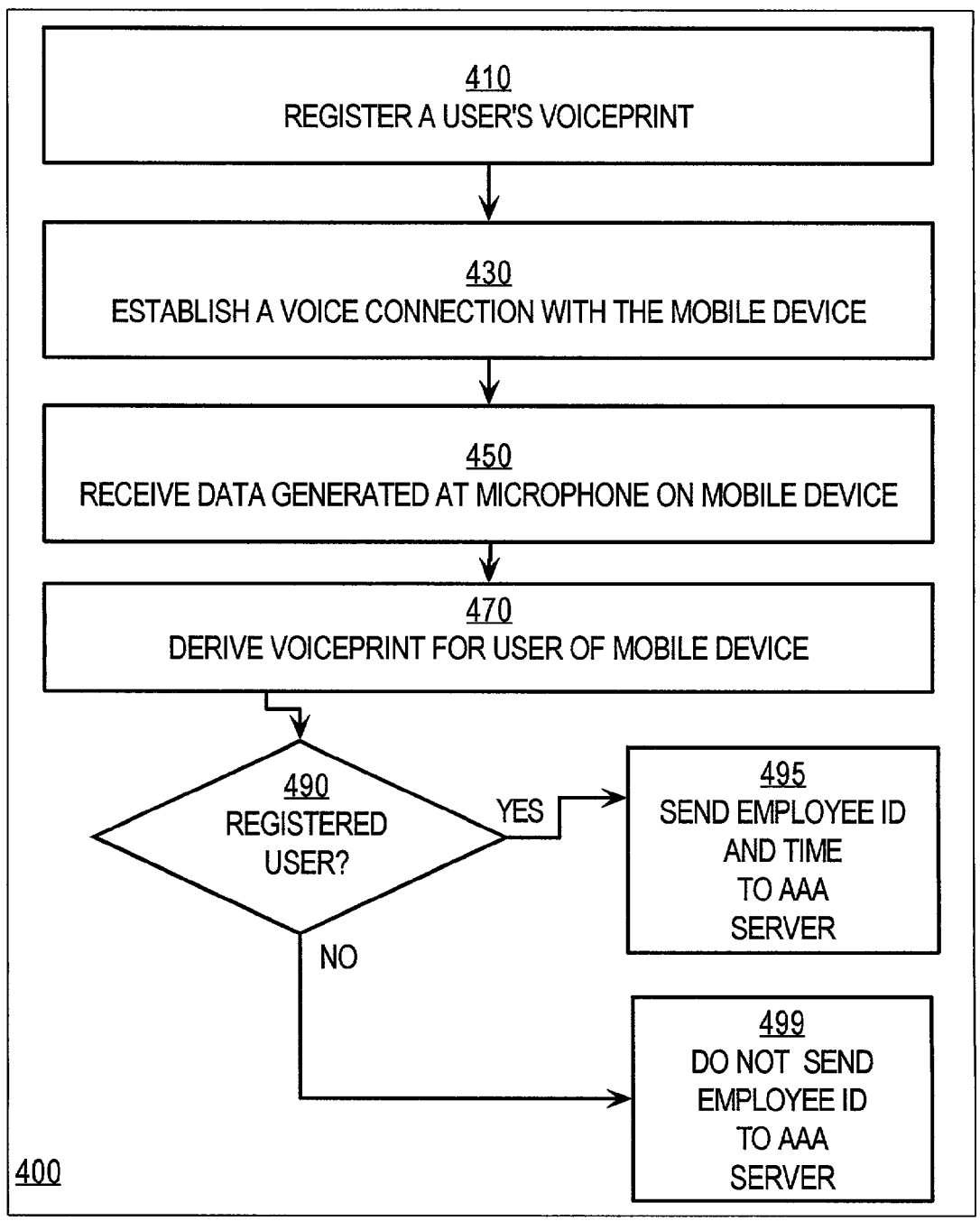
FIG. 4A is a flowchart that illustrates a high level overview of one embodiment of a method for granting access to network services to a user of a mobile device by a voice identification server.

FIG. 4A is a flowchart that illustrates a high level overview of one embodiment of a method 400 for granting access to network services to a user of a mobile device by a voice ID server 118. Although the steps are illustrated in FIG. 4A in a particular order, the steps may be reordered or occur at overlapping times in other embodiments.

In step 410, a voice of a user of the mobile device is registered as a registered voiceprint. This step is described in greater detail below with reference to FIG. 4B.

In step 430, a voice connection is established between the voice ID server on the intranet and the mobile device. This step is described in greater detail below with reference to FIG. 4C. Step 430 is performed in an embodiment in which the voice connection is initiated by the voice ID server 118. In the illustrated embodiment, the voice router 114 is configured to forward voice data between the voice ID server 118 and the public networks 106 through a circuit-switched connection 107.

Step 430 is optional and is not performed in some embodiments. For example, step 430 is not performed by the voice ID server in an embodiment in which the voice data is VoIP and the connection is already established through data router 112. For a second example, step 430 is not performed by the voice ID server in an embodiment in which the voice connection is established by placing a circuit-switched telephone call from the mobile device to the voice router 114.

In step 450, voice data generated at the microphone of the mobile device is received at the voice ID server through at least one of the voice connections established. In one embodiment, the data received is based, at least in part, on words spoken by the user as part of a "liveness" test. The liveness test provides a way for the system to confirm that the voice data it receives represents just-spoken speech by a "live" user, and is not entirely based on a recording made prior to generating the data at the microphone. For example, the data generated is based at least in part on words that include words prompted by the voice ID server, such as words presented as text on a display of the mobile device, or words announced aurally through a speaker of the mobile device. The prompted words may be selected randomly to thwart attempts at unauthorized access. Step 450 is described in greater detail below with reference to FIG. 4D.

In step 470 a voiceprint is derived from at least some of the data received in step 450. Step 470 is performed in any manner known in the art at the time an embodiment is implemented. For example, in one embodiment voiceprint generation and analysis is performed using a product available from Nuance Communications, Inc., of Menlo Park, Calif. According to this embodiment, the voiceprint is derived in the voice ID server of the intranet from the data generated at the microphone in the mobile device. The voice ID server has available the considerable computational resources consumed by voice print derivation and analysis. The voice ID server is better configured to perform voice analysis than the mobile device.

In step 490 it is determined whether the user of the mobile device is a registered user based, at least in part, on the voiceprint derived in step 470 and the registered voiceprint stored during step 410. An embodiment of step 490 is described in more detail below with reference to FIG. 4E. Voiceprint comparison and analysis is performed in any manner known in the art at the time an embodiment is implemented. For example, in one embodiment voiceprint matching and analysis is performed using a product available from Nuance. The analysis is performed on the voice ID server, which is better configured for voiceprint processing than the mobile device.

If it is determined in step 490 that the user is a registered user, then control passes to step 495 to send data indicating the registered user to the AAA server 116. In one embodiment, the unique identification for the user, such as the employee ID, is sent to the AAA server 116. The AAA server 116, rather than the voice ID server, determines whether to grant access for the intranet and its network services to the user of the mobile device.

If it is determined in step 490 that the user is a not a registered user, then control passes to step 499. In step 499 no data indicating a registered user is sent to the AAA server 116. In one embodiment, the number of failed attempts to identify a particular registered user is tracked, to determine whether some additional measures are needed in light of a concerted effort by one or more unauthorized users to gain access to the intranet.

According to the illustrated embodiment, a voice ID server 118 is modified to defer a decision about allowing access for the intranet to the AAA server 116 that performs additional determination before granting access.

Figure 4B:
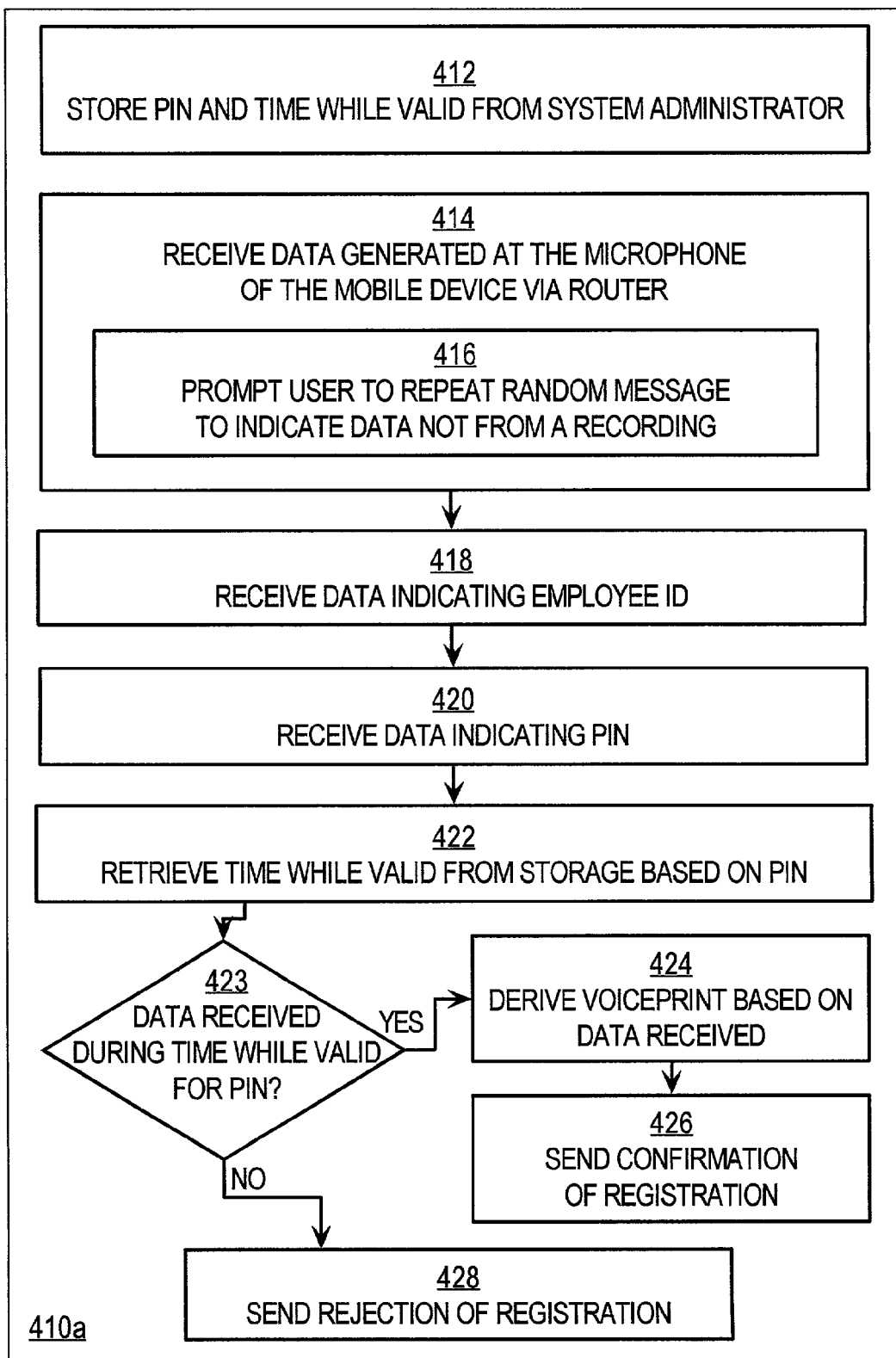
FIG. 4B is a flowchart that illustrates an embodiment of a step of the method depicted in FIG. 4A.

FIG. 4B is a flowchart that illustrates an embodiment 410a of step 410 for registering a user of a mobile device in the method depicted in FIG. 4A. Although the steps are illustrated in FIG. 4B in a particular order, the steps may be reordered or occur at overlapping times in other embodiments.

In step 412, a PIN and a time for which the PIN is valid is stored in a PIN data structure available to the voice ID server. The PIN and time while valid are obtained from a system administrator in one embodiment, and generated by the voice ID server automatically for the system administrator in another embodiment.

In step 414, the data generated at the microphone by the user of the mobile device in step 316, described above, is received by the voice ID server. For example, the data indicates the user's name and employee ID as spoken at the microphone of the wireless telephone. In some embodiments, step 414 includes optional step 416 in which the voice ID server presents a random phrase to be spoken by the user to test that the words spoken are live and not being played back from a recording made at some time before the data is generated at the microphone.

In step 418 data indicating the unique identifier for the user, such as the employee ID, is received. In some embodiments the employee ID is derived from voice data using speech recognition methods known in the art; in other embodiments, the employee ID is indicated by keystrokes made on the mobile device. Step 418 is optional if the unique identifier is already included in the data received in step 414.

In step 420, data indicating the PIN is received. In some embodiments, the PIN is derived from voice data using speech recognition; in other embodiments, the PIN is indicated by keystrokes made on the mobile device. Step 420 is optional if the PIN is already included in the data received in step 414.

In step 422, the time while the PIN is valid is retrieved from the PIN data structure. In step 423, it is determined whether the data received in step 414, which includes the employee ID and PIN in some embodiments, is received within the time while the PIN is valid.

If not, control passes to step 428 to send a message rejecting the registration. In some embodiments, the message comprises voice data for presenting aurally through speakers on the mobile device. In some embodiments, the message comprises text data for presentation on a display of the mobile device. In other embodiments, control passes to step 428 under other conditions as well. For example, control passes to step 428 if the employee ID entered in step 414 or step 418 is not a valid employee ID.

If it is determined in step 423 that the data is received within the time while the PIN is valid control passes to step 424. In step 424, a voiceprint is derived and stored in association with the unique user identification. For example, the voice ID server derives a registered voiceprint from the voice data and stores the registered voiceprint in association with the employee ID entered in step 414 or 418. Control then passes to step 426.

In step 426, a message confirming the registration of the user's voiceprint is sent to the mobile device. In some embodiments, the message comprises voice data for presenting aurally through speakers on the mobile device. In some embodiments, the message comprises text data for presentation on a display of the mobile device.

According to this embodiment, the voiceprint is derived from the data generated at the microphone in the voice ID server of the intranet, which server has available the considerable computational resources consumed by voice print derivation and analysis. Furthermore, in embodiments that derive the unique identification for the user and the PIN from voice data using speech recognition, a user is not burdened with multiple, sometime tedious and error-prone manual keystrokes but simply and naturally speaks the values. Such embodiments reduce both time and errors in the registration process.

Figure 4C:
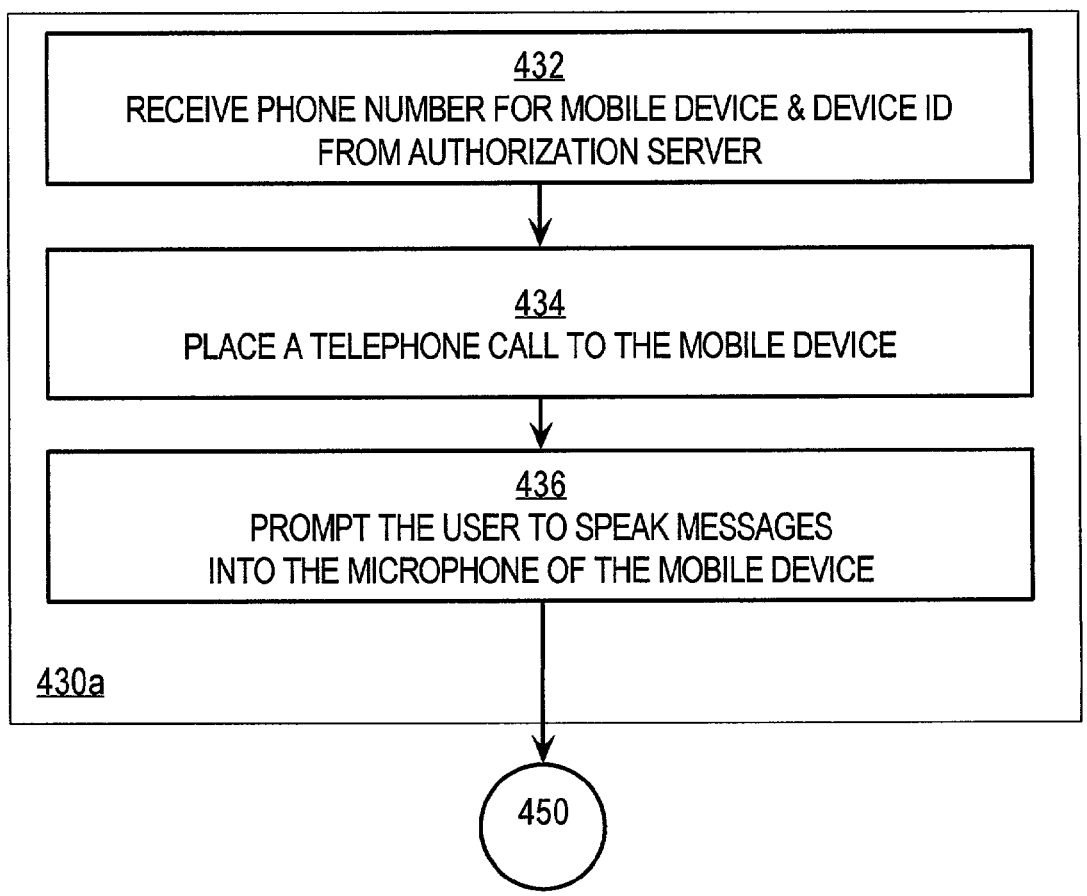
FIG. 4C is a flowchart that illustrates an embodiment of a step of the method depicted in FIG. 4A.

FIG. 4C is a flowchart that illustrates an embodiment 430*a* of step 430 for establishing a connection with the mobile device in the method depicted in FIG. 4A. Although the steps are illustrated in FIG. 4C in a particular order, the steps may be reordered or occur at overlapping times in other embodiments.

Step 430*a* is performed if the voice ID server initiates a voice connection with the mobile device. For example, step 430*a* is performed if the mobile device first contacts the intranet at the data router with a packet-switched communication channel 109.

In step 432, the voice ID server receives from the AAA server 116 data indicating an address for establishing voice a connection with the mobile device. For example, the data indicates a telephone number for a wireless telephone. In the illustrated embodiment, the data also includes a unique identification for the mobile device if different from the address.

In step 434, the voice ID server causes a voice connection to be established based on the address provided. For example, the voice ID server causes a telephone call to be placed to the telephone number of the wireless telephone. In the illustrated embodiment, the voice router 114 places the call in response to a request over the intranet 110 from the voice ID server.

In step 436, messages are sent to the mobile device to prompt the user to speak into the microphone. For example, the messages request that the user speak the user's employee ID into the microphone of the wireless telephone. In some embodiments the messages are announced aurally at speakers of the mobile device. In other embodiments the messages are presented as text on a display of the mobile device.

Figure 4D:
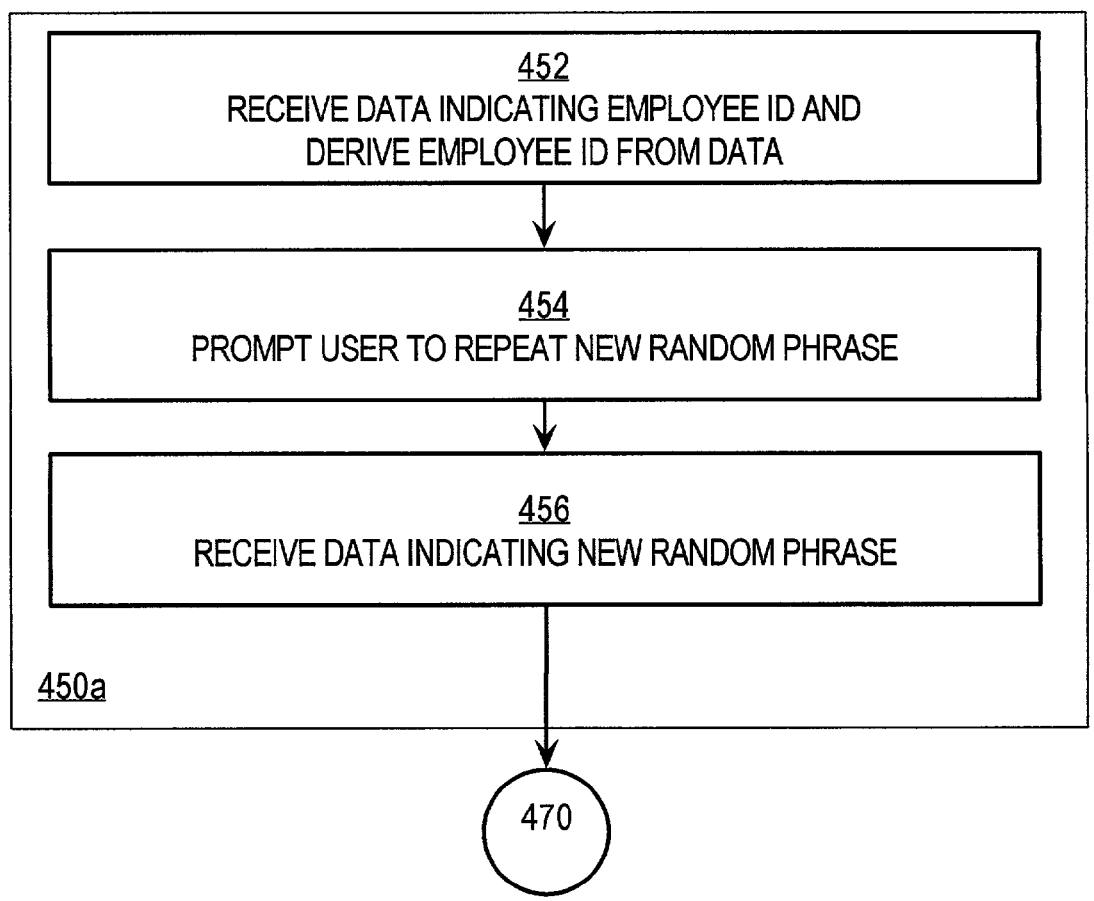
FIG. 4D is a flowchart that illustrates an embodiment of a step of the method depicted in FIG. 4A.

FIG. 4D is a flowchart that illustrates an embodiment 450*a* of step 450 for obtaining the data generated at a microphone of the mobile device that is received by the voice ID server in the method depicted in FIG. 4A. Although the steps are illustrated in FIG. 4D in a particular order, the steps may be reordered or occur at overlapping times in other embodiments.

In step 452, the data indicating the unique user identification, such as the employee ID, is received at the voice ID server. If received as voice data, speech recognition is used to derive the employee ID.

In step 454, the voice ID server sends a message to the mobile device requesting that the user speak a new random phrase, usually different than the random phrase, if any, spoken during registration. In some embodiments the messages are announced aurally at speakers of the mobile device. In other embodiments the messages are presented as text on a display of the mobile device. Step 454 is performed to support a liveness test for the data generated at the microphone of the mobile device, as described in more detail below with reference to FIG. 4E.

In step 456, data is received indicating the voice of the user speaking the new random phrase.

Figure 4E:
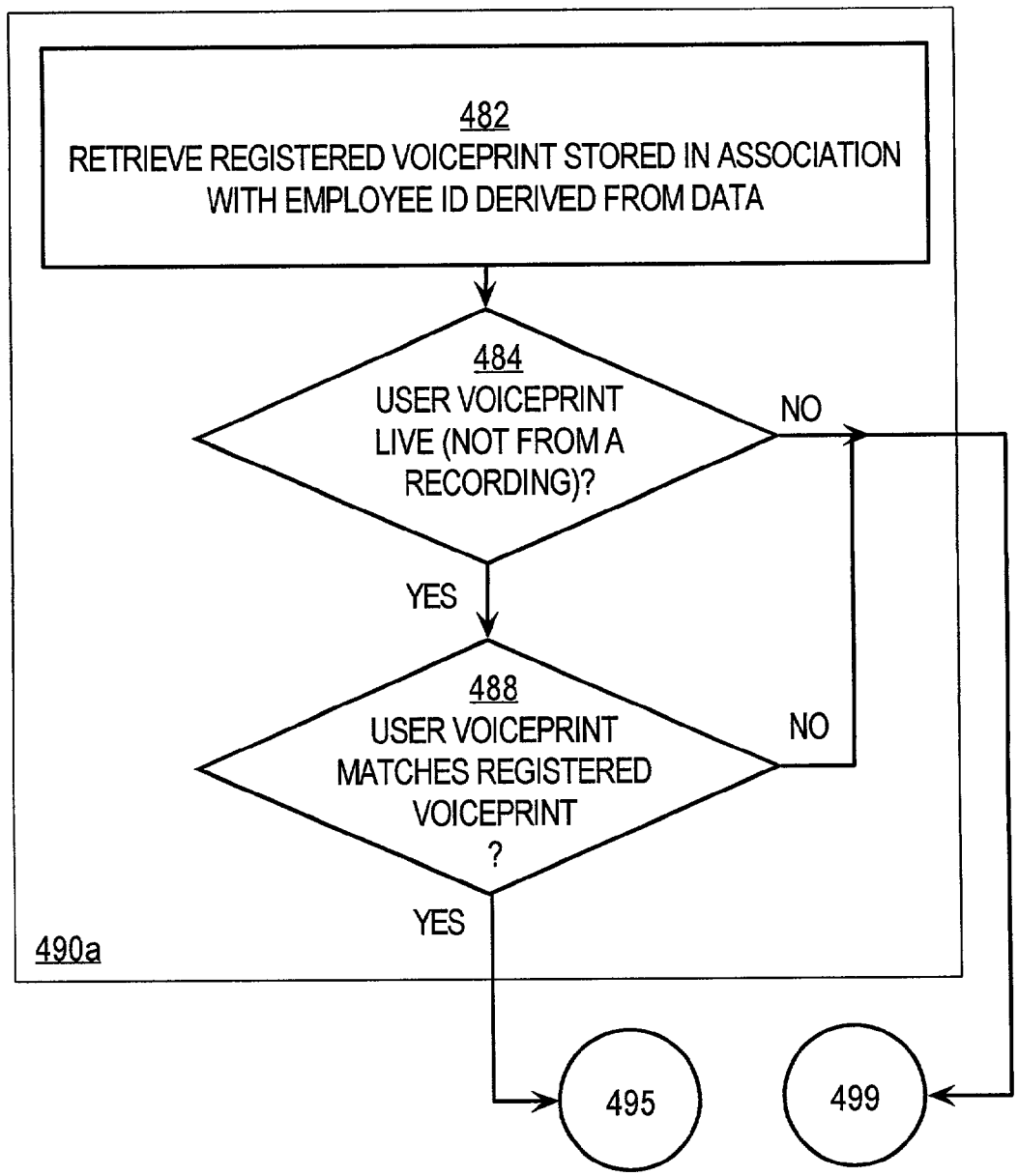
FIG. 4E is a flowchart that illustrates an embodiment of a step of the method depicted in FIG. 4A.

FIG. 4E is a flowchart that illustrates an embodiment 490*a* of step 490 for determining whether a user of the mobile device is a registered user in the method depicted in FIG. 4A. Although the steps are illustrated in FIG. 4E in a particular order, the steps may be reordered or occur at overlapping times in other embodiments.

In step 482, a registered voiceprint stored in a data structure at the voice ID server is retrieved. The voiceprint is stored in association with a unique identification for the user, such as the employee ID. In one embodiment, the employee ID associated with the user has not been identified, and step 482 involves retrieving one or more registered voiceprints until a match is obtained in step 488, described below. In another embodiment, the user has entered the unique identification for the user, such as the employee ID, and voiceprint associated with the unique identification for the user is retrieved. For example, the data structure is indexed to support rapid retrieval of a record based on the employee ID. Based on the employee ID, a particular registered voiceprint is retrieved in step 482. According to this embodiment, the particular registered voiceprint is the one compared during step 488, described below.

In step 484, a liveness test is performed to determine that the user's voice is not from a recording. For example, it is determined whether the voiceprint of the current user is based on data including the repeated random phrase. In some embodiments, this test includes a test that the phrase reconstructed using speech recognition from the data received is the same as the new random phrase in the message sent to the mobile device.

In step 486, it is determined whether the current user's voiceprint matches a registered voiceprint of a registered user. In some embodiments in which the employee ID is not provided, the user's voiceprint matches a registered voiceprint if it matches any registered voiceprint in the data structure. The employee ID associated with the matched voiceprint then identifies the registered user. In embodiments in which the employee ID is given by the current user, the voiceprint is compared to the registered voiceprint associated with the given employee ID. If those do not match, the user is considered not a registered user (even if the user's voiceprint matches the registered voiceprint of a different employee ID).

If the user is not a registered user, control passes to step 499 described above with reference to FIG. 4A. If the user is a registered user, control passes to step 495 to send data indicating the unique identification of the user, such as the employee ID, for the registered user, as described above with respect to FIG. 4A. The AAA server 116 then determines whether to grant access based, at least in part, on the registered user identified in the data sent by the voice ID server.

According to this embodiment, the voiceprint derivation and comparison are performed in the voice ID server, which is better configured than the mobile device to perform these functions.

—Hardware Overview

Figure 5:
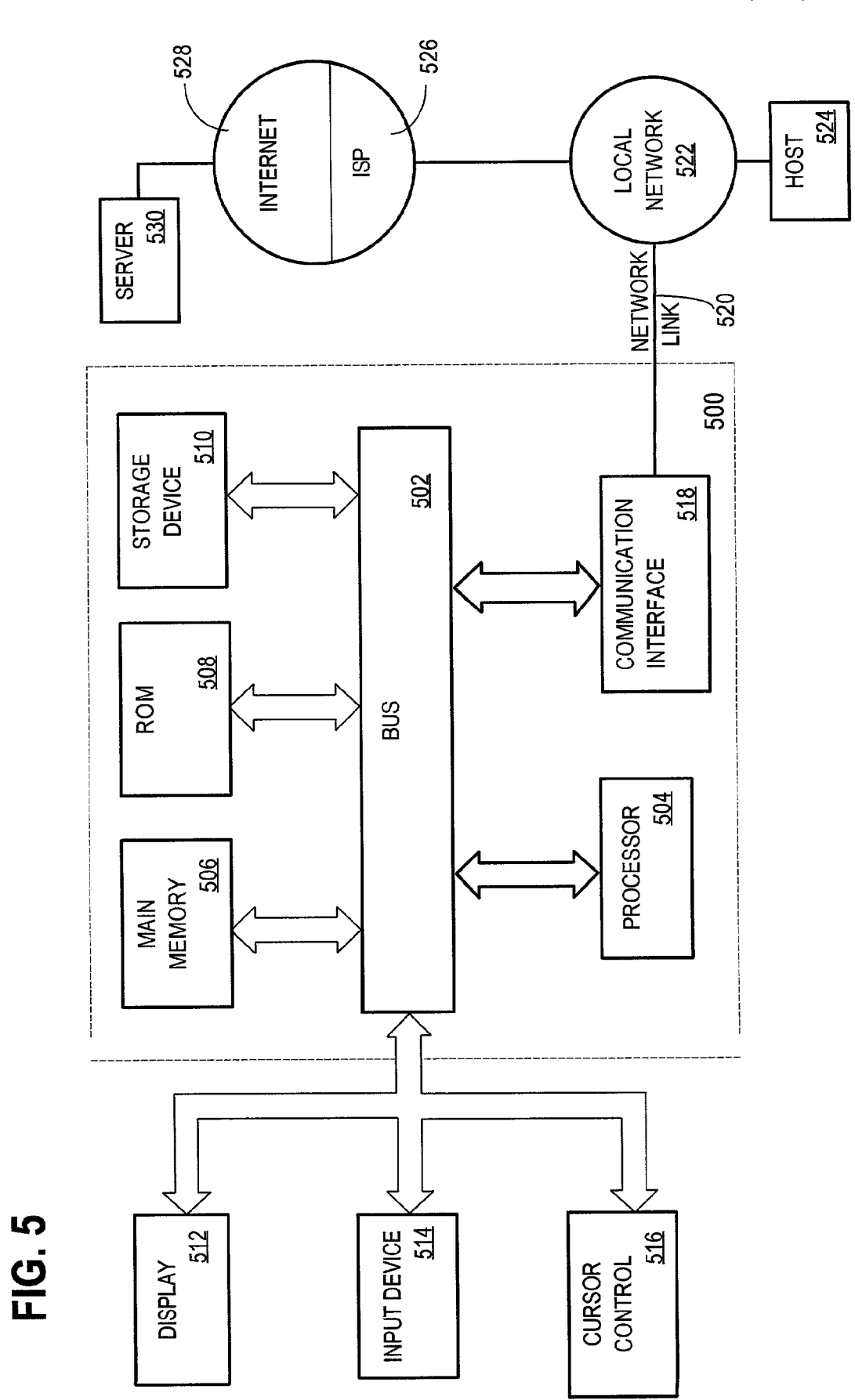
FIG. 5 is a block diagram that illustrates a computer system upon which an embodiment may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory ("RAM") or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory ("ROM") 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube ("CRT"), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 as an AAA server or a voice identification server or both. According to one embodiment of the invention, authorization services for the network are provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector can receive the data carried in the infrared signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network ("ISDN") card or a modem to provide a data communication connection to a corresponding type of telephone line. As another example, communication interface 518 may be a local area network ("LAN") card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider ("ISP") 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for obtaining access to network services from a mobile device as described herein.

The received code may be executed by processor 504 as it is received, and/or stored in storage device 510, or other non-volatile storage for later execution. In this manner, computer system 500 may obtain application code in the form of a carrier wave.

—Scope

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of granting access on a first network providing a network service to a user of a mobile device including a microphone, the method comprising the computer-implemented steps of:
   determining a first identification uniquely associated with a registered user having a registered voiceprint that matches a voiceprint of the user;
   determining a second identification uniquely associated with the mobile device;
   determining whether to grant access based on the first identification and the second identification; and
   if it is determined to grant access, granting access on the first network to the mobile device;
   wherein determining the first identification further comprises receiving first data indicating the first identification from a first process executing on a network infrastructure element in the first network, wherein the first process derives the voiceprint of the user from second data indicating a spoken message generated at the microphone of the mobile device.

2. A method as recited in claim 1, wherein the first process:
   determines whether the voice print matches the registered voiceprint of the registered user in a data store; and
   sends the first data only if the voiceprint matches the registered voiceprint.

3. A method as recited in claim 2, wherein the second data is received by the first process via a telephone call to a router configured to forward voice data to the first process.

4. A method as recited in claim 2, wherein the second data is received by the first process in response to a telephone call to the mobile device placed by the first process.

5. A method as recited in claim 2, wherein the first process further receives third data indicating the first identification.

6. A method as recited in claim 5, wherein the third data indicating the first identification is derived from the second data indicating the spoken message.

7. A method as recited in claim 1, said step of determining the second identification uniquely associated with the mobile device further comprising the step of receiving third data indicating the second identification in response to a request for a data connection with the network, wherein the request includes fourth data indicating the second identification.

8. A method as recited in claim 7, wherein the third data indicating the second identification is received from a second process executing on a network infrastructure element in the network, the second process sending the third data in response to receiving the request for the data connection with the network from the mobile device.

9. A method as recited in claim 8, wherein the second process executes on a router connected to a public packet switched network.

10. A method as recited in claim 8, said step of granting access further comprising sending fifth data indicating access granted to the second process, wherein, in response to receiving the fifth data, the second process opens a communication session with the mobile device.

11. A method as recited in claim 8, further comprising, if it determined to not grant access, then denying access by sending fifth data indicating access denied to the second process, wherein, in response to receiving the fifth data, the second process declines to open a communication session with the mobile device.

12. A method as recited in claim 1, said step of determining whether to grant access further comprising:
   determining whether the first identification is determined within a particular time period around a first time when the second identification is determined; and
   determining to not grant access if the first identification is determined beyond the particular time period around the first time.

13. A method as recited in claim 1, said step of determining whether to grant access further comprising:
   determining whether the first identification uniquely associated with the registered user is associated with the second identification uniquely associated with the mobile device in a first data structure stored on the network; and
   determining to grant access if the first identification is associated with the second identification in the first data structure.

14. A method as recited in claim 1, wherein the second identification is at least one of a user identification for an authorized user of the network, a user identification for an authorized user of the mobile device, and a unique identifier or serial number for the mobile device.

15. A method as recited in claim 1, further comprising the step of determining a third identification associated with a user of the mobile device.

16. A method as recited in claim 15, said step of determining the third identification further comprising the step of receiving third data indicating the third identification in response to a request for a data connection with the network, wherein the request includes fourth data indicating the third identification.

17. A method as recited in claim 16, said step of determining whether to grant access further comprising:
   determining whether the first identification uniquely associated with the registered user is associated with at least one of the second identification uniquely associated with the mobile device and the third identification associated with a user of the mobile device in a first data structure stored on the network; and
   determining to grant access if the first identification is associated with at least one of the second identification and the third identification in the first data structure.

18. A method of obtaining access on a network having a network service by a user of a mobile device including a microphone, the method comprising the steps of:
   establishing a connection between the mobile device and the network that forwards the user's voice to a first process associated with the network service;
   speaking into the mobile device to provide a voiceprint of the user in the first process;
   sending data from the mobile device indicating a unique identification for the mobile device to a second process associated with the network service; and
   obtaining access on the network only if a registered user associated with the voiceprint by the first process is also associated with the unique identification in a data structure stored on the network.

19. A method as recited in claim 18, wherein
   said step of establishing the connection further comprises establishing a circuit-switched voice connection with a first router on the network;

the method further comprises establishing a packet-switched data connection with a second router on the network; and said step of establishing the packet-switched data connection includes said step of sending the data indicating the unique identification for the mobile device.

20. A method as recited in claim 18, said step of obtaining access for the network service further comprising obtaining access for the network service only if a first time when a registered user is associated with the voiceprint is within a particular time period around a second time when the data indicating the unique identification is sent to the second process.

21. A method as recited in claim 18, further comprising the step of registering the user to create and store data indicating a registered user.

22. A method of granting access on a first network having a network service to a user of a mobile device including a microphone, the method comprising the computer-implemented steps of:
   receiving first data generated at the microphone of the mobile device;
   deriving a first voiceprint from the first data;
   determining whether to send second data indicating the user is a registered user to a first process on the network based at least in part on the first voiceprint; and
   if it is determined to send the second data, sending the second data to the first process for determining whether to authorize the user for access on the first network;
   wherein the steps are performed by one or more processes executing on a network infrastructure element in the first network.

23. A method as recited in claim 22, said step of determining whether to send the second data further comprising:
   determining whether the first voiceprint matches a registered voiceprint stored in a first data structure; and
   determining to send the second data only if the first voiceprint matches the registered voiceprint.

24. A method as recited in claim 23, wherein the first data is received via a telephone call to a router configured to forward voice data.

25. A method as recited in claim 23, wherein:
   the method further comprises the step of placing a telephone call to the mobile device; and
   the first data is received in response to said step of placing the telephone call.

26. A method as recited in claim 23, wherein:
   the method further comprises the step of receiving a unique identification for the mobile device from the first process; and
   said step of placing the telephone call is performed in response to said step of receiving the unique identification for the mobile device.

27. A method as recited in claim 23, further comprising receiving third data from the mobile device indicating a unique identification for the registered user.

28. A method as recited in claim 27, wherein the third data indicating the unique identification for the registered user is derived from the first data generated at the microphone.

29. A method as recited in claim 27, wherein:
   the unique identification is stored in association with a registered voiceprint in a first data structure; and
   said step of determining whether to send the second data further comprises
      retrieving the registered voiceprint stored in the first data structure based on the third data indicating the unique identification for the registered user;
      determining whether the first voiceprint matches the registered voiceprint, and
      determining to send the second data only if the first voiceprint matches the registered voiceprint.

30. A method as recited in claim 22, wherein the second data indicates a unique identification for the registered user.

31. A method as recited in claim 22, further comprising the step of registering the user to create and store a registered voiceprint associated with the registered user.

32. A method as recited in claim 31, said step of registering the user further comprises the steps of:
   receiving third data generated by the user at the microphone;
   receiving fourth data indicating a unique identification associated with the user;
   receiving fifth data indicating a personal identification number;
   retrieving from a first data structure a certain time for which the personal identification number is valid;
   determining whether the third data is received during the certain time for which the personal identification number is valid,
   if the fifth data is received during the certain time for which the personal identification number is valid, then deriving the registered voiceprint from at least one of the third data and the fourth data and the fifth data, and
   storing the registered voiceprint in association with the unique identification in a second data structure.

33. A computer-readable medium carrying one or more sequences of instructions for granting access on a network having a network service to a user of a mobile device including a microphone, which instructions, when executed by one or more processors, cause the one or more processors to carry out the steps of:
   determining a first identification uniquely associated with a registered user having a registered voiceprint that matches a voiceprint of the user;
   determining a second identification uniquely associated with the mobile device;
   determining whether to grant access based on the first identification and the second identification; and
   if it is determined to grant access, granting access on the first network to the user;
   wherein of determining the first identification further comprises receiving first data indicating the first identification from a first process executing on a network infrastructure element in the first network, wherein the first process derives the voiceprint of the user from second data indicating a spoken message generated at the microphone of the mobile device.

34. An apparatus for granting access on a first network having a network service to a user of a mobile device including a microphone, comprising:
   means for determining a first identification uniquely associated with a registered user having a registered voiceprint that matches a voiceprint of the user;
   means for determining a second identification uniquely associated with the mobile device;
   means for determining whether to grant access based on the first identification and the second identification; and
   means for granting access on the first network to the user if it is determined to grant access;
   wherein said means for determining the first identification further comprises means for receiving first data indicating the first identification from a first process executing on a network infrastructure element in the first network, wherein the first process comprises means for deriving the voiceprint of the user from second data indicating a spoken message generated at the microphone of the mobile device.

35. An apparatus as recited in claim 34, wherein the means for deriving the voiceprint comprises:
    means for determining whether the voice print matches the registered voiceprint of the registered user in a data store; and
    means for sending the first data only if the voiceprint matches the registered voiceprint.

36. An apparatus as recited in claim 35, comprising means for receiving the second data by the first process via a telephone call to a router configured to forward voice data to the first process.

37. An apparatus as recited in claim 35, comprising means for receiving the second data by the first process in response to a telephone call to the mobile device placed by the first process.

38. An apparatus as recited in claim 34, comprising means for receiving at the first process third data indicating the first identification.

39. An apparatus as recited in claim 38, comprising means for deriving the third data indicating the first identification from the second data indicating the spoken message.

40. An apparatus as recited in claim 34, wherein said means for determining the second identification uniquely associated with the mobile device further comprises means for receiving third data indicating the second identification in response to a request for a data connection with the network, wherein the request includes fourth data indicating the second identification.

41. An apparatus as recited in claim 40, comprising means for receiving the third data indicating the second identification from a second process executing on a network infrastructure element in the network, and means for sending the third data from the second process in response to receiving the request for the data connection with the network from the mobile device.

42. An apparatus as recited in claim 41, wherein the second process is on a router connected to a public packet switched network.

43. An apparatus as recited in claim 41, wherein said means for granting access further comprises means for sending fifth data indicating access granted to the second process, and means for the second process opening a communication session with the mobile device in response to receiving the fifth data.

44. An apparatus as recited in claim 41, further comprising means for denying access by sending fifth data indicating access denied to the second process when access is not granted, and means for declining to open a communication session with the mobile device in response to receiving the fifth data.

45. An apparatus as recited in claim 34, wherein said means for determining whether to grant access further comprises:
    means for determining whether the first identification is determined within a particular time period around a first time when the second identification is determined; and
    means for determining to not grant access if the first identification is determined beyond the particular time period around the first time.

46. An apparatus as recited in claim 34, wherein said step of determining whether to grant access further comprises:
    means for determining whether the first identification uniquely associated with the registered user is associated with the second identification uniquely associated with the mobile device in a first data structure stored on the network; and
    means for determining to grant access if the first identification is associated with the second identification in the first data structure.

47. An apparatus as recited in claim 34, wherein the second identification is at least one of a user identification for an authorized user of the network, a user identification for an authorized user of the mobile device, and a unique identifier or serial number for the mobile device.

48. An apparatus as recited in claim 34, further comprising means for determining a third identification associated with a user of the mobile device.

49. An apparatus as recited in claim 48, said means for determining the third identification further comprising means for receiving third data indicating the third identification in response to a request for a data connection with the network, wherein the request includes fourth data indicating the third identification.

50. An apparatus as recited in claim 49, said means for determining whether to grant access further comprising:
    means for determining whether the first identification uniquely associated with the registered user is associated with at least one of the second identification uniquely associated with the mobile device and the third identification associated with a user of the mobile device in a first data structure stored on the network; and
    means for determining to grant access if the first identification is associated with at least one of the second identification and the third identification in the first data structure.

51. A system for granting access on a first network to a user, comprising:
    a mobile device including a microphone employed by the user for communicating with a public network;
    a network device that is coupled to the first network and the public network for limiting access to the first network;
    one or more processors connected to the first network;
    one or more stored sequences of instructions which, when executed by the one or more processors, cause the one or more processors to carry out the steps of:
        determining a first identification uniquely associated with a registered user having a registered voiceprint that matches a voiceprint of the user;
        determining a second identification uniquely associated with the mobile device;
        determining whether to grant access based on the first identification and the second identification; and
        if it is determined to grant access, causing the network device to grant access to the user for the first network;
        wherein determining the first identification further comprises receiving first data indicating the first identification from a first process executing on a network infrastructure element in the first network, wherein the first process derives the voiceprint of the user from second data indicating a spoken message generated at the microphone of the mobile device.

52. A system as recited in claim 51, wherein the first process comprises instructions which when executed cause the first process to determine whether the voice print matches the registered voiceprint of the registered user in a data store and to send the first data only if the voiceprint matches the registered voiceprint.

53. A system as recited in claim 52, comprising instructions which when executed cause receiving the second data by the first process via a telephone call to a router configured to forward voice data to the first process.

54. A system as recited in claim 52, comprising instructions which when executed cause receiving the second data by the first process in response to a telephone call to the mobile device placed by the first process.

55. A system as recited in claim 51, comprising instructions which when executed cause the first process receiving third data indicating the first identification.

56. A system as recited in claim 55, comprising instructions which when executed cause deriving the third data indicating the first identification from the second data indicating the spoken message.

57. A system as recited in claim 51, wherein the instructions for determining the second identification uniquely associated with the mobile device further comprise instructions which when executed cause receiving third data indicating the second identification in response to a request for a data connection with the network, wherein the request includes fourth data indicating the second identification.

58. A system as recited in claim 57, comprising instructions which when executed cause receiving the third data indicating the second identification from a second process executing on a network infrastructure element in the network, and cause the second process sending the third data in response to receiving the request for the data connection with the network from the mobile device.

59. A system as recited in claim 58, wherein the second process is on a router connected to a public packet switched network.

60. A system as recited in claim 58, the instructions for granting access further comprising instructions which when executed cause sending fifth data indicating access granted to the second process, and cause the second process opening a communication session with the mobile device in response to receiving the fifth data.

61. A system as recited in claim 58, further comprising instructions which when executed by the one or more processors cause performing:
 denying access by sending fifth data indicating access denied to the second process if it determined to not grant access;
 the second process declining to open a communication session with the mobile device in response to receiving the fifth data.

62. A system as recited in claim 51, wherein the instructions for determining whether to grant access further comprise instructions which when executed cause performing:
 determining whether the first identification is determined within a particular time period around a first time when the second identification is determined; and
 determining to not grant access if the first identification is determined beyond the particular time period around the first time.

63. A system as recited in claim 51, wherein the instructions for determining whether to grant access further comprise instructions which when executed cause performing:
 determining whether the first identification uniquely associated with the registered user is associated with the second identification uniquely associated with the mobile device in a first data structure stored on the network; and
 determining to grant access if the first identification is associated with the second identification in the first data structure.

64. A system as recited in claim 51, wherein the second identification is at least one of a user identification for an authorized user of the network, a user identification for an authorized user of the mobile device, and a unique identifier or serial number for the mobile device.

65. A system as recited in claim 51, further comprising instructions which when executed by the one or more processors cause determining a third identification associated with a user of the mobile device.

66. A system as recited in claim 65, wherein the instructions for determining the third identification further comprise instructions which when executed cause receiving third data indicating the third identification in response to a request for a data connection with the network, wherein the request includes fourth data indicating the third identification.

67. A system as recited in claim 66, wherein the instructions for determining further comprise instructions which when executed cause performing:
 determining whether the first identification uniquely associated with the registered user is associated with at least one of the second identification uniquely associated with the mobile device and the third identification associated with a user of the mobile device in a first data structure stored on the network; and
 determining to grant access if the first identification is associated with at least one of the second identification and the third identification in the first data structure.

* * * * *